United States Patent
Georgy et al.

(10) Patent No.: US 9,423,509 B2
(45) Date of Patent: Aug. 23, 2016

(54) MOVING PLATFORM INS RANGE CORRECTOR (MPIRC)

(75) Inventors: Jacques Georgy, Calgary (CA); Zainab Syed, Calgary (CA); Chris Goodall, Calgary (CA); Naser El-Sheimy, Calgary (CA); Aboelmagd Noureldin, Kingston (CA)

(73) Assignee: Trusted Positioning Inc., Calgary, AB (CA)

( * ) Notice: Subject to any disclaimer, the term of this patent is extended or adjusted under 35 U.S.C. 154(b) by 437 days.

(21) Appl. No.: 13/806,686
(22) PCT Filed: Jun. 27, 2011
(86) PCT No.: PCT/CA2011/000743
§ 371 (c)(1),
(2), (4) Date: Mar. 12, 2013
(87) PCT Pub. No.: WO2011/160213
PCT Pub. Date: Dec. 29, 2011

(65) Prior Publication Data
US 2013/0211713 A1    Aug. 15, 2013

Related U.S. Application Data

(60) Provisional application No. 61/358,531, filed on Jun. 25, 2010.

(51) Int. Cl.
*G01S 5/00* (2006.01)
*G01S 19/49* (2010.01)
*H04B 10/00* (2013.01)
*G01S 19/47* (2010.01)
*G01S 19/51* (2010.01)

(52) U.S. Cl.
CPC . *G01S 19/49* (2013.01); *G01S 5/00* (2013.01); *G01S 19/47* (2013.01); *G01S 19/51* (2013.01); *H04B 10/00* (2013.01)

(58) Field of Classification Search
CPC ........... G01S 5/10; G01S 19/33; G01S 19/41; G01S 5/009; G01S 5/0242; G01S 5/0072; G01S 3/02; G01S 5/14; G01S 19/49; G01S 5/00; H04B 7/185

USPC .............. 701/1, 16, 301, 469, 470, 472, 500, 701/518; 702/92, 153
See application file for complete search history.

(56) References Cited

U.S. PATENT DOCUMENTS 6,094,163 A    7/2000  Chang
6,424,914 B1 * 7/2002  Lin ............................... 701/470
(Continued)

FOREIGN PATENT DOCUMENTS

GB         2479437 A    10/2011
WO    WO 2007135115 A1 * 11/2007

OTHER PUBLICATIONS

Coatantiec, WO 2007135115 machine translation, published Nov. 29, 2007.*

*Primary Examiner* — Jelani Smith
(74) *Attorney, Agent, or Firm* — Bay Area Technology Law Group PC

(57) ABSTRACT

A moving platform INS range corrector ("MPIRC") module and its method of operation for providing navigation and positioning information. The module comprises: means, such as a receiver, for receiving a first set of absolute navigational information from an external source (such as satellites in case of GNSS); an inertial sensor unit for generating a second set of navigational information at the module; and a transceiver, for receiving and/or transmitting signals and estimating distance measurement from a known position and receiving position coordinates. The navigational information is used by a processor programmed with a core algorithm, to produce a navigation solution (which comprises position, velocity and attitude). The system has the following attributes: the solution is produced seamlessly, even if one source of navigational information is temporarily out of service; the accuracy of the solution is assisted by use of distance and position coordinate measurement from a known position.

37 Claims, 11 Drawing Sheets

(56) References Cited

U.S. PATENT DOCUMENTS

| | | |
|---|---|---|
| 2004/0036650 A1 | 2/2004 | Morgan |
| 2004/0193372 A1* | 9/2004 | MacNeille ............ G01C 21/26 701/468 |
| 2005/0114023 A1* | 5/2005 | Williamson et al. .......... 701/214 |
| 2005/0143916 A1 | 6/2005 | Kim et al. |
| 2006/0074558 A1* | 4/2006 | Williamson et al. .......... 701/213 |
| 2011/0054729 A1* | 3/2011 | Whitehead et al. ............. 701/29 |
| 2012/0004846 A1* | 1/2012 | Coatantiec et al. ........... 701/470 |

\* cited by examiner

MOVING PLATFORM INS RANGE CORRECTOR (MPIRC)

CROSS REFERENCE TO RELATED APPLICATIONS

The present application is a 371 of International Application No. PCT/CA2011/000743, filed on Jun. 27, 2011, which claims priority to U.S. Provisional Application No. 61/358,531, entitled "Moving Platform INS Range Corrector (MPIRC)", filed at the United States Patent and Trademark Office on Jun. 25, 2010.

FIELD OF THE INVENTION

The present invention relates generally to positioning and navigation systems adapted for use in environments with good, limited, degraded, or denied absolute navigation signals.

BACKGROUND OF THE INVENTION

The positioning of a moving platform, such as, for example, vehicles or individuals, is commonly achieved using known reference-based systems which are absolute navigation systems, such as, among others, the Global Navigation Satellite Systems (GNSS). The GNSS comprises a group of satellites that transmit encoded signals and receivers on the ground, by means of trilateration techniques, can calculate their position using, for example, the travel time of the satellites' signals and information about the satellites' current location.

Currently, the most popular form of GNSS for obtaining absolute position measurements is the global positioning system (GPS), which is capable of providing accurate position and velocity information provided that there is sufficient satellite coverage. However, in any GNSS, where the satellite signal becomes disrupted or blocked such as, for example, in urban settings, tunnels, canopies, dense foliages, mines, and other GNSS-degraded or GNSS-denied environments, a degradation or interruption or "gap" in the GPS positioning information can result.

In order to achieve more accurate, consistent and uninterrupted positioning information, GNSS information may be augmented with additional positioning information obtained from complementary positioning systems. Such systems may be self-contained and/or "non-reference based" systems within the platform, and thus need not depend upon external sources of information that can become interrupted or blocked.

One such "non-reference based" or relative positioning system is the inertial navigation system (INS). Inertial sensors are self-contained sensors within the platform that use gyroscopes to measure the platform's rate of rotation/angle, and accelerometers to measure the platform's specific force (from which acceleration is obtained). Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

Given that each positioning technique described above may suffer either loss of information or errors in data, common practice involves integrating the information/data obtained from the GNSS with that of the INS. For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

Although available, integrated INS/GNSS is not often used commercially for low cost applications because of the relatively high cost of navigational or tactical grades of inertial measurement units (IMUs) needed to obtain reliable independent positioning and navigation during GNSS outages. Low cost, small, lightweight and low power consumption Micro-Electro-Mechanical Systems (MEMS)-based inertial sensors may be used together with low cost GNSS receivers, but the performance of the navigation system will degrade very quickly in contrast to the higher grade IMUs in areas with little or no GNSS signal availability due to time-dependent accumulation of errors from the INS.

The integration of INS and GNSS rely on a filtering technique or a state estimation technique such as, for example, Kalman filter (KF), Linearalized KF (LKF), Extended KF (EKF), Unscented KF (UKF), and Particle filter (PF) among others.

The KF, as an example, estimates the system state at some time point and then obtains observation "updates" in the form of noisy measurements. As such, the equations for the KF fall into two groups:

Time update or "prediction" equations: used to project forward in time the current state and error covariance estimates to obtain an a priori estimate for the next step, or Measurement update or "correction" equations: used to incorporate a new measurement into the a priori estimate to obtain an improved posteriori estimate.

There are several ranging systems that can be used to measure distances between transmitters and receivers. Examples of such systems are WiFi™, Bluetooth™, ZigBee™, Radio Frequency ID Tags (RFID), Ultra-Wideband (UWB), and dedicated radio frequency (RF) transceivers, such as 457 kHz avalanche transceivers (e.g. Mammut Pulse Barryvox™).

If a vehicle, equipped with a ranging system and an integrated INS/GNSS navigation system, operates in areas with little or no GNSS signal availability, the navigation accuracy will degrade with time due to time-dependent accumulation of errors from the INS. The ranging system of the vehicle is commonly used to detect road hazards such as other vehicles without providing any aid to the navigation solution.

Commercially available systems using wireless signals for positioning purposes, in order to derive a position of a roving receiver with respect to a base station, typically use a method, such as for example: proximity location, trilateration or fingerprinting. Proximity location sets the position of the remote receiver at the position of the known base station making it a rough approximation method. Trilateration requires multiple ranging signals and is best employed in scenarios with a dense grid of base stations with overlapping ranges. Fingerprinting requires access to a pre-survey database with known base stations positions. The main pitfall with fingerprinting is maintenance of an accurate database, which cannot be enabled when the actual base stations are moving, as is the case of moving base station platforms. Fingerprinting is more useful when the base stations are fixed in location, such as WiFi access points (AP's). Other wireless methods use angle of arrival (e.g. Radar) to determine a more accurate location. These systems require installation of special directional or multi-element antennas.

All of these wireless positioning techniques need more than one wireless piece of information in order to provide accurate rover position, especially when the base station is moving. When only a single wireless range measurement is available, it is not enough to provide acceptable positioning accuracy.

SUMMARY

The present system comprises an apparatus and method for providing an improved navigation solution, wherein the system comprises combining various forms of navigational information, or a subset thereof. More specifically, the present system comprises an apparatus and method for providing a navigation solution for a moving platform, wherein the apparatus and method are capable of incorporating:

- readings from a sensor assembly, wherein the readings relate to navigational information (such as, for example, INS) about the moving platform,
- absolute navigational information (such as, for example, GNSS) about the moving platform, and
- range or distance measurements from another platform with known navigation state (with error margin) and the navigation state from the other platform, wherein the measurements relate to the distance between the two platforms and the navigation state relates to the other platform, wherein the navigation state may comprise position, velocity and attitude, or a subset thereof (hereinafter referred to as "navigation state").

In operation, the present system may obtain the foregoing navigational information in a variety of ways. For explanatory purposes only, the present system may comprise two modules, namely:

- a first module or "rover device", for which the navigation solution is determined, and
- a second module or "base station", which may be providing aiding navigational information to the rover device, where necessary, as further described herein.

It is understood that both the first and second modules can be static or moving, and that both modules may be interchangeable that is, from time to time, a rover device may change its role and become a base station and vice versa. In other words, it is understood that either the rover device or the base station platforms may be operative to provide the present navigation solution (i.e. each platform may be "Moving Platform INS Range Corrector" or "MPIRC"-enabled).

The first module may comprise a static or moving MPIRC-enabled "rover device". In one embodiment, the rover device may comprise a self-contained sensor assembly for obtaining/generating readings (such as, for example, relative or non-reference based navigational information) relating to the navigational information of the rover device and producing an output indicative thereof. The sensor assembly may comprise accelerometers, gyroscopes, magnetometers, barometers and any other self-contained means that are capable of generating navigational information.

The rover device may further comprise a device for receiving and/or transmitting (herein after generally referred to as a "transceiver") signals used to obtain distance or range measurements between the rover device and one or more base stations, and for sending/receiving the navigation state between the rover device and one or more base stations, wherein the navigation state may comprise position, velocity and attitude, or a subset thereof (hereinafter referred to as "navigation state". The transceiver may also be used to calculate an estimate of the distance between the device and one or more base stations, and may communicate the estimate between the rover device and the base station(s) in the form of output indicative thereof.

The first module may further comprise at least one processor, coupled to receive the output information from the sensor assembly and the transceiver, and programmed to use the output information to determine and produce the present navigation solution. The present navigation solution may provide instantaneous position, velocity and attitude information, or a subset thereof, of the rover device.

In another embodiment, the first module may further comprise a receiver for receiving absolute navigational information about the rover device from external sources such as, for example, a satellite, and the receiver in this example would be a GNSS receiver, and producing an output of navigational information indicative thereof. It is understood that in this embodiment, the at least one processor of the first module would be coupled to receive the output information from the sensor assembly, the transceiver and the absolute navigation receiver and programmed to use the output information to determine and produce the present navigation solution. The present navigation solution may provide instantaneous position, velocity and attitude information, or a subset thereof, of the rover device.

The first module may be unable to obtain all the various forms of navigational information, such as, for example, where the absolute navigational information may be limited, degraded or denied. Thus, the first module may combine its sensor-based navigation solution with single range measurement to limit the sensor-based position drift and provide more accuracy than, for example, sensor-only navigation or simple proximity method.

The second module or "base station" may be a static or moving MPIRC-enabled "base station". In one embodiment, the base station may comprise a receiver for receiving absolute navigational information about the base station from external sources such as, for example, a satellite, and the receiver in this example would be a GNSS receiver, and producing an output of navigational information indicative thereof.

The base station may further comprise a device for receiving and/or transmitting (herein after referred to as a "transceiver") signals used to obtain distance or range measurements between the base station and one or more rover devices, and for sending/receiving the navigation state between the rover device and one or more base stations, wherein the navigation state may comprise position, velocity and attitude, or a subset thereof (hereinafter referred to as "navigation state"). The transceiver may also be used to calculate an estimate of the distance between the base station and one or more rover devices, and may communicate the estimate between the base station and the rover device(s) in the form of output indicative thereof.

The second module referred to as "base station" may further comprise at least one processor, coupled to receive the output information from the absolute navigation receiver and possibly the transceiver, and programmed to use the output information to determine and produce a navigation solution. The solution may provide instantaneous position, velocity and attitude information, or a subset thereof, of the base station device.

In another embodiment, the second module may further comprise a self-contained sensor assembly for obtaining/generating readings (such as, for example, relative or non-reference based navigational information) relating to the navigational information of the base station and producing an output indicative thereof. The sensor assembly may comprise accelerometers, gyroscopes, magnetometers, barometers and any other self-contained means that are capable of generating navigational information. It is understood that in this embodiment, the at least one processor of the second module would be coupled to receive the output information from the sensor assembly, possibly the transceiver and the absolute navigation receiver and programmed to use the output information to determine and produce the present navigation solution. The present navigation solution may provide instantaneous position, velocity and attitude information, or a subset thereof, of the base station device.

The present disclosure, therefore, provides a system comprising a first module capable of combining various forms of navigational information, or a subset thereof, and capable of accessing at least one second module(s), where necessary, to obtain aiding information such as ranging information between the two modules and the navigation state of the second module, thereby providing an enhanced seamless navigational solution. The present system comprises a method of obtaining and processing different forms of navigational information, or a subset thereof, and further comprises an MPIRC-enabled apparatus that is operative to obtain and process the navigational information, thereby providing a navigation solution consisting of instantaneous position, velocity and attitude information, or a subset thereof, of a platform.

Broadly speaking, in one aspect of the present system, a method is provided for combining navigational information, or a subset thereof, for producing a navigation solution of a first MPIRC-enabled module, wherein the first module is operative to combine the information and enabled to communicate with at least one MPIRC-enabled second module operative to combine navigational information, the method comprising:

a) obtaining readings from a sensor assembly of self-contained sensors within the first module, wherein the readings relate to navigational information of the first module, and producing an output indicative thereof;

b) obtaining absolute navigational information of the first module from external sources, and producing an output indicative thereof;

c) receiving and/or transmitting signals used to estimate ranging information between the first module and the at least one second module, receiving and/or transmitting navigation state, and producing aiding signals indicative thereof; and d) providing at least one processor for processing the sensor assembly readings, the absolute navigational information, and the aiding signals to produce a navigation solution relating to the first module, wherein the at least one processor is capable of utilizing the aiding signals to enhance the navigation solution when the absolute navigation information is limited, degraded or denied.

In another aspect of the present system, a first MPIRC-enabled module, operative to combine navigational information, or a subset thereof, and enabled to communicate with at least one second MPIRC-enabled module operative to combine navigational information, is provided for providing a navigation solution of the first module, the first module comprising:

an assembly of self-contained sensors, within the first module, capable of obtaining readings and producing an output indicative thereof;

means for obtaining absolute navigational information of the first module from external sources and producing an output indicative thereof;

a transceiver for receiving and/or transmitting signals used to estimate distance or range measurements between the first module and the at least one second module, for receiving and/or transmitting navigation state between the first module and the at least one second module, and producing aiding signals indicative thereof; and at least one processor, coupled to receive the output information from the sensor assembly, the absolute navigation information, and the aiding signals, wherein the at least one processor is capable of utilizing the aiding signals to produce an enhanced navigation solution for the first module when the absolute navigation information is limited, degraded or denied.

It is noted that the transceiver for receiving and/or transmitting signals may be a wireless device and the wireless signals may be of any type (such as for example, electromagnetic or acoustic) and that the transmission media can be any media (such as for example, through air or underwater). The wireless signals are chosen to suit the transmission media where they operate.

Optionally, it is understood that there may be a physical link between two or more of the MPIRC-enabled modules. A physical link may be rigid, non-rigid or flexible. It is understood that the presence of a physical link may add kinetic constraints that may be used to constrain the navigation solution, thereby enhancing the solution, especially if the absolute navigation information is limited, degraded or denied. An example of rigid link may be found in agriculture equipment, while an example of flexible or non-rigid link may be found in towed, submerged underwater equipment, such as for example sonobuoys.

Optionally, the present navigation solution may be communicated to a display and shown thereon. The display may be part of the MPIRC-enabled module, or may be separate from and wired or wirelessly connected to the module.

The present system may be applicable in circumstances where a first module or rover device is navigating by sensor only navigation (e.g. INS only) such as, for example, a person under snow in an avalanche, but is capable of communicating via a transceiver (wireless or wired) that can, for example:

(i) be used to estimate the range from a second module or base station as well as transmitting the navigation state of the base station to the rover device, thereby enabling the calculation of improved navigation state estimates of the rover device. The improved navigation state can then be sent from the rover device to the base station if needed; or (ii) to relay the range and rover navigation state information (even if inaccurate) to a base station having an absolute navigation state, such as, for example, range signal to a person above the snow the person above the snow has access to GNSS, that can then calculate improved navigation state of the rover device.

As mentioned, the base station may also be equipped with a transceiver (wireless or wired) and that can either (i) transmit the range and base station navigation state to the rover device, or (ii) receive the range and rover navigation state from the rover device.

Another example of this scenario would be a rover mining truck that is operating close to a pit wall and is navigating with sensor only or INS only (GNSS signals blocked), while another mining truck (base station truck) away from the wall has access to GNSS and is also providing a ranging signal and navigation state via a communication link such as transceiver to the rover truck near the wall. The rover truck is receiving the information through a transceiver to enhance its positioning solution. In another scenario, the rover might be the one transmitting to the base station, so that the base can calculate the range between them as well as receiving the rover navigation state (even if inaccurate) and will calculate a more accurate rover navigation state and may send it back to the rover.

DESCRIPTION OF THE EMBODIMENTS

The present system comprises a method for combining different forms of information, or a subset thereof, for producing a navigation solution of a first MPIRC-enabled module, wherein the first module is operative to combine navigational information and enabled to communicate with at least one MPIRC-enabled second module operative to combine different forms of navigational information, the method comprising:

a) obtaining readings from a sensor assembly of self-contained sensors within the first module, wherein the readings relate to navigational information of the first module, and producing an output indicative thereof;

b) obtaining absolute navigational information of the first module from external sources, and producing an output indicative thereof;

c) receiving and/or transmitting signals used to estimate ranging information between the first module and the at least one second module, receiving and/or transmitting navigation state, and producing aiding signals indicative thereof; and d) providing at least one processor for processing the sensor assembly readings, the absolute navigational information, and the aiding signals to produce a navigation solution relating to the first module, wherein the at least one processor is capable of utilizing the aiding signals to enhance the navigation solution when the absolute navigation information is limited, degraded or denied.

The present system further comprises a first MPIRC-enabled module 10, wherein the first module 10 is operative to combine navigational information and enabled to communicate with at least one second MPIRC-enabled module 20 operative to combine information, for providing a navigation solution of the first module 10.

By way of example, the present system may comprise communication between two MPIRC-enabled modules, namely:

a first module or "rover device" 10, for which the navigation solution is determined, and a second module or "base station" 20, which may provide aiding navigational information to the rover device 10, where necessary, as further described herein.

Figure 1:
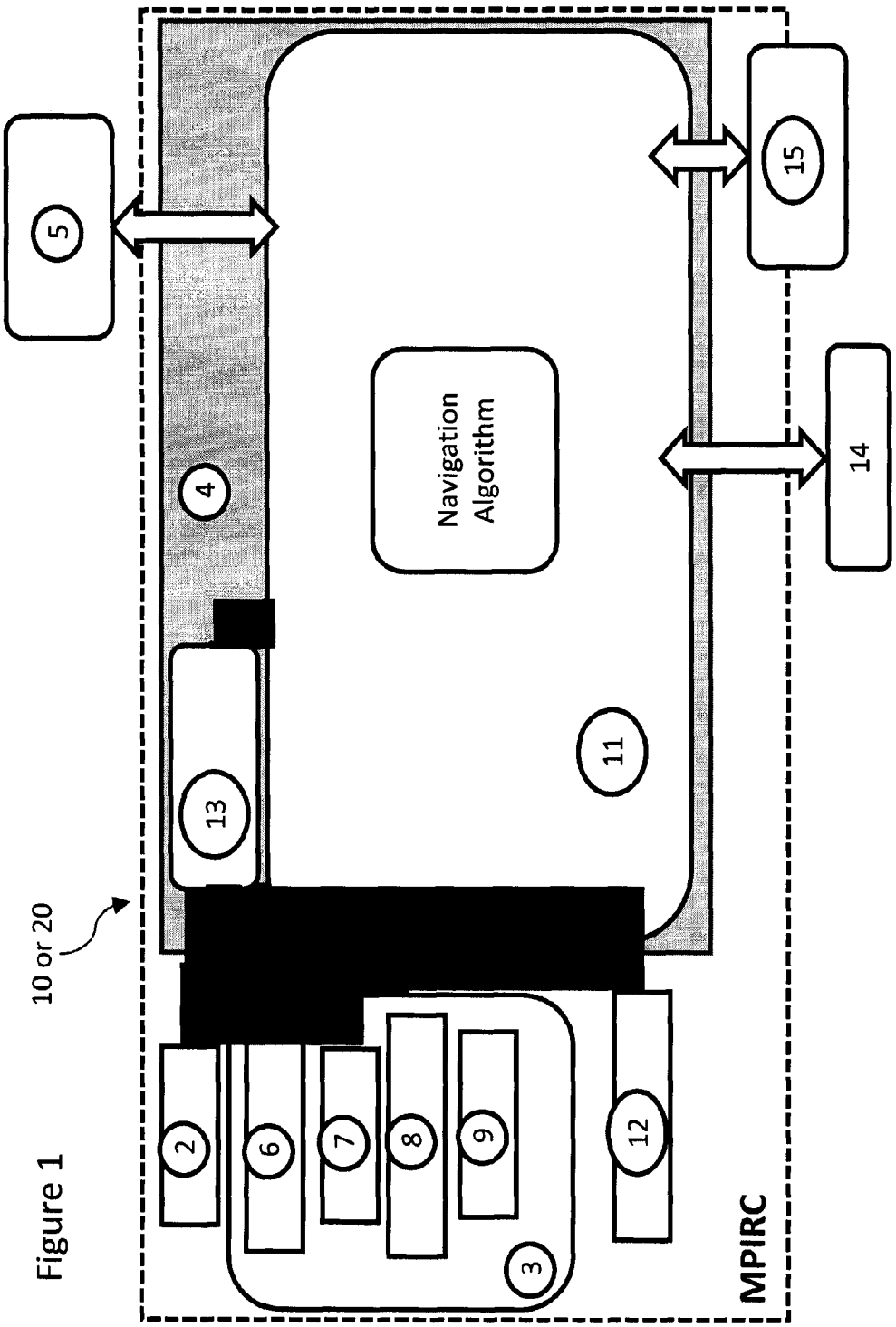
FIG. 1 is a block diagram of an MPIRC-enabled module.
Figure 2:
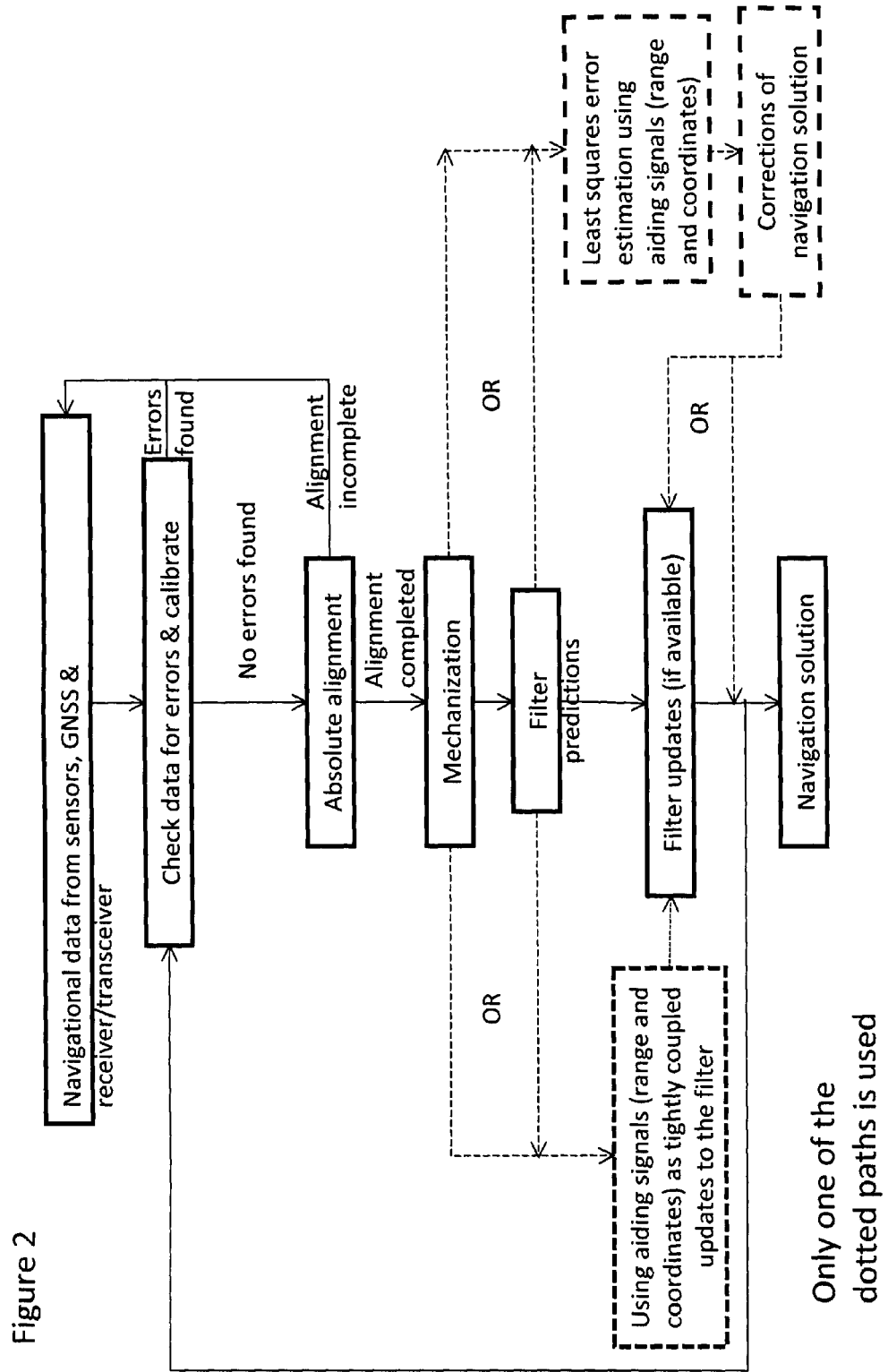
FIG. 2 is a flowchart illustrating the ranging signals as updates.

Having regard to FIG. 1, the first module 10 may comprise a static or moving MPIRC-enabled "rover device". In one embodiment, the rover device 10 may comprise sensor means 3, in the form of a sensor assembly, capable of obtaining or generating "relative" or "non-reference based" readings relating to navigational information about the first module 10, and producing an output indicative thereof. The sensor assembly 3 may be made up of accelerometers 6, for measuring specific forces (and obtaining accelerations), and gyroscopes 7, for measuring module turning rates. Optionally, the sensor assembly 3 may have other self-contained sensors such as, without limitation, magnetometers 8, for measuring magnetic field strength for establishing heading, barometers 9, for measuring pressure to establish altitude, or any other self-contained sensors.

In another embodiment, the sensor assembly 3 may operate with inertial sensors, namely two accelerometers 6 for monitoring forward/backward and lateral directions specific forces (and obtaining corresponding accelerations) and a vertical gyroscope 7 for monitoring heading rate. In a preferred embodiment, a full complement of three orthogonal accelerometers 6 and three orthogonal gyroscopes 7 is utilized.

The first module 10 may comprise a sensor assembly 3 comprising an orthogonal triad of accelerometers 6 and gyroscopes 7. In one embodiment, the sensor assembly 3 may comprise orthogonal Micro-Electro-Mechanical Systems (MEMS) accelerometers 6, and MEMS gyroscopes 7, such as, for example, those obtained in one inertial measurement unit package from Analog Devices Inc. (ADI) Model No. ADIS16405, Model No. ADIS16375, or Model No. ADIS16385. The inertial sensors might be in different packages such as an accelerometer triad from Analog Devices Inc. (ADI) Model No. ADIS 16240, and such as a gyroscope triad from Invensense Model No. ITG-3200. The sensor assembly 3 may or may not include orthogonal magnetometers 8 either available in the same package as the IMU or in another package such as, for example model HMC5883L from Honeywell, and barometers 9 such as, for example, model MS5803 from Measurement Specialties.

The first module rover device 10 may further comprise a device 12 for receiving and/or transmitting (herein after referred to as a "transceiver") signals (wired or wireless) used to obtain distance or range measurements between the rover device 10 and one or more base stations 20, and for sending/receiving navigation state between the rover device 10 and the one or more base stations 20. The transceiver 12 may also be used to calculate an estimate of the distance between the rover device 10 and one or more base stations 20, and may communicate the estimate between the rover device 10 and the base station(s) 20 in the form of output indicative thereof.

The first module 10 may further comprise a transceiver 12, or a similar device, which is capable of transmitting and/or receiving aiding signals (wired or wireless) and converting the aiding signals into measured distance or range information. For example, it is contemplated that navigation of rover mining trucks with receiver 12 only systems that are receiving aiding information from a control base station fitted with a transmitter only will benefit from the present system. The distance or range information comprises the distance or range between the first module 10 (mining truck) and the second module 20 (control base station). Both the first module 10 and the second module 20 equipped with wireless transceivers and are capable of transmitting and/or receiving signals, such that the range between the first 10 and second 20 module may be calculated and determined. Furthermore, these transceivers may communicate the range or distance information and/or the navigation state with each other. In addition to the range or distance information, it is understood that the transceiver 12 is further capable of communicating navigation state information with the second module 20. Once determined, the range or distance information and/or the position information of the second module, may be provided in the form of an output indicative thereof.

In one embodiment, the transceiver 12 may be a UWB transceiver available from Multispectral Solutions Inc.

It is noted that the information communicated between MPIRC-enabled platforms or modules can be of any type (such as for example, electromagnetic or acoustic) and that the transmission media can be any media (such as for example, through air or underwater). The signals are chosen to suit the transmission media where they operate.

The first module rover device 10 may further comprise at least one processor 4, coupled to receive the output information from the sensor assembly 3 and the transceiver 12, and programmed to use the output information to determine and produce a navigation solution. The navigation solution may provide instantaneous position, velocity and attitude information, or a subset thereof, of the rover device.

The first module rover device 10 may comprise a single processor such as, for example, an ARM Cortex R4 or an ARM Cortex A8 to integrate and process the navigational information, or a subset thereof. The at least one processor 4 may comprise a micro-processor 11 and memory 13.

In another embodiment, the sources of navigational information, or some of them, may initially be captured and synchronized by at least one first-stage processor such as, for example, an ST Micro (STM32) family or other known basic microcontroller, before being subsequently transferred to a second processor such as, for example, an ARM Cortex R4 or ARM Cortex A8 for higher level processing.

In another embodiment, the first module 10 may further comprise a receiver 2 for receiving "absolute" or "reference-based" navigation information about the rover device 10 from external sources such as, for example, a satellite. For example, the receiver 2 means may be a GNSS receiver capable of receiving navigational information from GNSS satellites and converting the information into position, and velocity information about the first module 10. The GNSS receiver 2 may also provide navigation information in the form of raw measurements such as pseudoranges and Doppler shifts. In one embodiment, the GNSS receiver may be a Global Positioning System (GPS) receiver, such as a uBlox LEA-5T receiver module. It is to be understood that any number of receiver means may be used including, for example and without limitation, a NovAtel OEM 4 GPS receiver, a NovAtel OEMV-1G GPS receiver, a Trimble BD982 GPS receiver, or a Trimble Lassen SQ GPS receiver.

It is understood that in this embodiment, the at least one processor 4 of the first module 10 would be coupled to receive the output information from the sensor assembly 3, the transceiver 12 and the absolute navigation receiver 2, and programmed to use the output information to determine and produce a navigation solution. The solution may provide instantaneous position, velocity and attitude information, or a subset thereof, of the rover device.

The first module or rover device 10 may be unable to obtain the all the navigational information, such as, for example, where the absolute navigational information may be limited, degraded or denied. Thus, it is contemplated that the first module 10 may combine its sensor-based navigation solution with single range measurement to limit the sensor-based position drift and provide better accuracy than, for example, sensor-only navigation or simple proximity method.

The second module 20 may be a static or moving MPIRC-enabled "base station". In one embodiment, the base station 20 may comprise a receiver 2 for receiving absolute navigational information about the base station 20 from external sources such as, for example, a satellite, and the receiver in this example would be a GNSS receiver, and producing an output of navigational information indicative thereof. In one embodiment, the GNSS receiver may be a Global Positioning System (GPS) receiver, such as a uBlox LEA-5T receiver module. It is to be understood that any number of receiver means may be used including, for example and without limitation, a NovAtel OEM 4 GPS receiver, a NovAtel OEMV-1G GPS receiver, a Trimble BD982 GPS receiver, or a Trimble Lassen SQ GPS receiver.

The base station 20 may further comprise a device 12 for receiving and/or transmitting (herein after referred to as a "transceiver") signals (wired or wireless) used to obtain distance or range measurements between the base station 20 and one or more rover devices 10, and for sending/receiving navigation state between the base station 20 and the one or more rover devices 10. The transceiver 12 may also be used to calculate an estimate of the distance between the base station 20 and one or more rover devices 10, and may communicate the estimate between the base station 20 and the rover device(s) 10 in the form of output indicative thereof.

The second module base station 20 may further comprise at least one processor 4, coupled to receive the output information from the absolute navigation receiver 2 and the transceiver 12, and programmed to use the output information to determine and produce a navigation solution. The solution may provide instantaneous position, velocity and attitude information, or a subset thereof, of the base station device.

In another embodiment, the second module base station 20 may further comprise a self-contained sensor assembly 3 for obtaining/generating readings (such as, for example, relative or non-reference based navigational information) relating to the navigational information of the base station 20 and producing an output indicative thereof. The sensor assembly 3 may comprise accelerometers 6, gyroscopes 7, magnetometers 8, barometers 9 and any other self-contained means that are capable of generating navigational information.

It is understood that in this embodiment, the at least one processor 4 of the second module 20 would be coupled to receive the output information from the sensor assembly 3, the transceiver 12 and the absolute navigation receiver 2, and programmed to use the output information to determine and produce a navigation solution. The solution may provide instantaneous position, velocity and attitude information, or a subset thereof, of the base station device.

It is understood that any MPIRC-enabled module may further comprise a display means 5 for displaying the present navigation solution. The navigation solution determined by an MPIRC-enabled module may be communicated to a display or user interface 5. It is contemplated that the display 5 be part of the MPIRC-enabled module, or separate therefrom (e.g., connected wired or wirelessly thereto). The navigation solution determined by an MPIRC-enabled module may further be stored or saved to a memory device/card 15 operatively connected to the module.

The navigation solution determined by an MPIRC-enabled module may be output through a port 14. This port might be connected to any other system that will use this information.

The at least one processor 4 may be programmed for processing the absolute navigational information, the sensor assembly readings and the range and navigation state information, or a subset thereof, to produce a navigation solution relating to the MPIRC-enabled module. In order to fuse the different sources of information, the processor 4 may be programmed to use a state estimation or filtering technique such as, for example, Kalman filter (KF), Linearalized KF (LKF), Extended KF (EKF), Unscented KF (UKF), and Particle filter (PF) among others. The at least one processor 4 is capable of utilizing the range and navigation state information to enhance the navigation solution when the absolute navigation information is unavailable, degraded or blocked.

It is to be noted that the state estimation or filtering techniques used by the processor 4 for inertial sensors/GNSS integration may operate in a total-state approach or in an error state approach. Not all the state estimation or filtering techniques may operate in both approaches. In the total-state approach, the state estimation or filtering technique is estimating the state of the navigation module itself (such as position, velocity, and attitude of the module), the system model or the state transition model used is the motion model itself, which in case of inertial navigation is a nonlinear model. In the error-state approach, the motion model is used externally in what is called inertial mechanization, which is a nonlinear model as mentioned earlier, the output of this model is the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transition the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. The error-state system model might be a linearized model (like the models used with KF-based solutions), or might be a nonlinear model.

For the sake of demonstration and without limitations, the following discussion assumes that the state estimation technique used is an EKF. In this case, the processor 4 may be programmed with:

a mechanization algorithm for converting the data from the self-contained sensor assembly 3 to navigational information by using mechanization equations such as are described herein;

an absolute alignment algorithm; and a core algorithm for using the navigational information and producing a filtered navigation solution, guidance of which is provided in the core algorithm section.

Mechanization Algorithm:

The angular velocities from the gyros, $\omega_{ib}^b$, are integrated in time to compute the angular displacements of the body relative to its initial orientation. First initial orientation is computed by alignment of the inertial sensors as discussed in the next section. The specific force measurements $f^b$ are used to calculate body acceleration which is later used in estimating position differences after double integration with respect to time. To summarize, all the navigation parameters can be estimated by solving equation 1 which uses specific force and angular velocity measurements.

$$\begin{pmatrix} \dot{r}^l \\ \dot{v}^l \\ \dot{R}_b^l \end{pmatrix} = \begin{pmatrix} D^{-1} v^l \\ R_b^l f^b - (2\Omega_{ie}^l + \Omega_{el}^l) v^l + g^l \\ R_b^l (\Omega_{ib}^b - \Omega_{il}^b) \end{pmatrix} \quad 1$$

$$\dot{r}^l = \begin{pmatrix} \dot{\varphi} \\ \dot{\lambda} \\ \dot{h} \end{pmatrix} = \begin{pmatrix} \frac{1}{M+h} & 0 & 0 \\ 0 & \frac{1}{(N+h)\cos\varphi} & 0 \\ 0 & 0 & -1 \end{pmatrix} \begin{pmatrix} V^n \\ V^e \\ V^d \end{pmatrix} = D^{-1} v^l \quad 2$$

$\varphi$, $\lambda$ and h are latitude, longitude and height of the body; M and N are meridian and prime vertical radius of curvatures, $v^l$ is the velocity in NED frame with the following components $$v^l = \begin{pmatrix} V^n \\ V^e \\ V^d \end{pmatrix} \quad 3$$

and the scaling matrix is defined as $$D^{-1} = \begin{pmatrix} \frac{1}{M+h} & 0 & 0 \\ 0 & \frac{1}{(N+h)\cos\varphi} & 0 \\ 0 & 0 & -1 \end{pmatrix} \quad 4$$

The rotation matrix from the body frame (b-frame) to the local level frame (l-frame) is denoted as $R_b^l$. The rotation matrix at the start of navigation is obtained by utilizing the roll (r), pitch (p) and heading (A) information from the alignment phase discussed in the next section.

$$R_b^l = R_3(-A) R^2(-p) R_1(-r) \quad 5$$

where the most expanded form of the rotation matrix is as follows:

$$R_b^l = \begin{bmatrix} \cos r \cos A & -\cos p \sin A + \sin p \sin r \cos A & \sin p \sin A + \cos p \sin r \cos A \\ \cos r \sin A & \cos p \cos A + \sin p \sin r \sin A & -\sin p \sin A + \cos p \sin r \sin A \\ -\sin r & \sin p \cos r & \cos p \cos r \end{bmatrix}$$

The angular velocities term, $2\omega_{ie}^l + \omega_{el}^l$, is explained below:

$$2\omega_{ie}^l + \omega_{el}^l = 2\begin{pmatrix} \omega^e \cos\varphi \\ 0 \\ \omega^e \sin\varphi \end{pmatrix} + \begin{pmatrix} \dfrac{V^e}{N+h} \\ \dfrac{-V^n}{M+h} \\ -\dfrac{V^e \tan\varphi}{N+h} \end{pmatrix} \quad (6)$$

$$= \begin{pmatrix} \dfrac{V^e}{N+h} + 2\omega^e \cos\varphi \\ -\dfrac{V^n}{M+h} \\ -\dfrac{V^e \tan\varphi}{N+h} + 2\omega^e \sin\varphi \end{pmatrix}$$

$$= \begin{pmatrix} \omega_x \\ \omega_y \\ \omega_z \end{pmatrix}$$

where, $\omega^e$ is the rotation rate of the Earth as mentioned before. The $2\Omega_{ie}^l + \Omega_{el}^l$ used in equation 1 is the skew-symmetric representation of equation 6 which can be given as:

$$2\Omega_{ie}^l + \Omega_{el}^l = \begin{pmatrix} 0 & -\omega_z & \omega_y \\ \omega_z & 0 & -\omega_x \\ -\omega_y & \omega_x & 0 \end{pmatrix} \quad (7)$$

$\Omega_{ie}^l$ is the angular velocity of the Earth centered Earth Fixed frame (e-frame) with respect to the inertial frame (i-frame) as given in the l-frame and $\Omega_{el}^l$ is the angular velocity of the l-frame with respect to the e-frame as measured in the l-frame. $g^l$ is the normal gravity vector in the l-frame. $\Omega_{il}^b$ is the skew symmetric representation of $\omega_{il}^b$ which is the angular velocity of the l-frame with respect to the i-frame as represented in the b-frame.

$$\omega_{il}^b = R_l^b \begin{pmatrix} \dfrac{V^e}{N+h} + \omega^e \cos\varphi \\ -\dfrac{V^n}{M+h} \\ -\dfrac{V^e \tan\varphi}{N+h} + \omega^e \sin\varphi \end{pmatrix} \quad (8)$$

After obtaining the velocity in the NED frame, all the parameters requiring the velocity can be computed. As an example, equations 6 and 8 estimate two different angular velocity terms for the mechanization equations and both of them require velocity. The first rotation matrix $R_b^l$ is estimated by the initial alignment of the system with respect to the l-frame as mentioned earlier and will be discussed in the alignment algorithm provided below.

Alignment Algorithm:

Gyros and accelerometers measure the angular rates $\omega_{ib}^b$ and specific forces ($f^b$), respectively, in b-frame but navigation is usually performed with respect to the l-frame. Alignment requires computation of the orientation from the b-frame to the l-frame ($R_b^l$) and is the first step in inertial navigation. There are different methods to perform alignment which are provided as follows:

Manual: Using orientation information provided by the user
Semi-automatic: Using accelerometer levelling for roll and pitch but the heading is provided by the user
Automatic: Using accelerometer levelling for roll and pitch, and velocity matching for heading.

Accelerometer levelling computes the roll and pitch of the sensor system by using the strong gravity signals. Consider an orthogonal triad of stationary accelerometers placed on a surface which is tilted by a small angle r with respect to the reference x-axis (generally called roll). Now due to this tilt, each accelerometer will measure a component of the gravity signal (g). The roll can be calculated using measured specific forces from the accelerometers ($f^b$)

$$r = \arctan 2(-f_y, -f_z) \quad (9)$$

where $f_y$ and $f_z$ are y and z accelerometers signals.

A similar method can be used if the inertial measurement unit (IMU) or the vehicle is tilted by some angle with respect to the y-axis. This angular displacement is called pitch (p) and can be derived as follows:

$$p = \arctan 2(f_x, \sqrt{f_y^2 + f_z^2}) \quad (10)$$

A velocity matching technique is used to estimate the heading of the b-frame with respect to the North direction in the l-frame. GPS positions and velocities measurements can be used for the alignment of the IMU. The heading or azimuth of a vehicle can be determined by incorporating north and east velocity components from the GPS receiver. Along with the roll and pitch information calculated by using the accelerometer signals, the vehicle's attitude can be estimated by incorporating the GPS derived velocities. At every GPS update, the positions, velocities and heading can be updated to improve the navigation solution accuracy.

Heading is always measured from the North direction and therefore, can be written in terms of equation 11. This method requires good maneuvering and the best results are obtained with velocities over 10 m/s.

$$A = \arctan 2(V^E, V^N) \quad (11)$$

Core Algorithm:

Theoretically, IMU and GPS can both estimate navigation parameters for a body in motion. However, both systems have their own problems. For example, the time-dependent position errors can drift quickly due to the integration of the acceleration and angular rate data for IMU based navigation. GPS provided absolute and drift free positions are only possible when the receiver has a direct line of sight to four or more satellites.

The combination of the two systems can offer a number of advantages. The drift errors of the IMU can be controlled by the GPS updates and for short GPS signal outages, the IMU stand-alone navigation capabilities can be exploited for seamless navigation. Moreover, the combination of the two systems, i.e., IMU and GPS, will provide redundant measurements and will result in improved reliability of the combined system.

A Kalman Filter (KF) is used to optimally combine the redundant information in which the inertial state vector is regularly updated by GPS measurement. Two integration strategies can be implemented at the software level using the KF approach.

Loosely Coupled Integration

The most commonly implemented integration scheme is called loosely coupled in which the GPS derived positions, velocities along with their accuracies from GPS KF are used as updates for the navigation KF. The error states include both the navigation errors and sensor errors. To further improve the accuracy of the navigation solution, the error states are fed back to the mechanization.

There are certain advantages and disadvantages of using this integration scheme. For instance, one of the advantages is the smaller size of state vectors for both GPS and INS KF as compared to the state vector in the tightly coupled integration which results in the improved computation capabilities. A disadvantage of using such a system is the extra process noise due to the presence of two KFs which may decrease the signal to noise ratio. Consequently, the probability that the integration filter will trust the predicted states more than the measurements will increase which is not desirable.

Tightly Coupled Integration

Tightly coupled integration is also known as centralized KF approach. The major difference between the loosely coupled defined earlier and tightly coupled is the number of KFs present in the two schemes. The tightly coupled integration uses one centralized KF that integrates the pseudorange ($\rho$) and Doppler ($f_{dopp}$) information from the GPS receiver and the (position, velocity and attitude) PVA information from the mechanization of the inertial system.

The error states of the integration KF are composed of navigation errors, inertial sensor errors and GPS receiver clock errors. The inertial sensor errors and GPS receiver clock errors are then fed back to compensate for these errors for the next epoch PVA estimation. The $\rho$ and $f_{dopp}$ measurements from GPS, combined with the INS derived pseudorange and Doppler for every satellite i, are used as the observations for the integration KF.

Tightly coupled algorithm takes the raw GPS ephemeris, raw GPS measurements and ionosphere corrections parameters file to perform the integration.

The loosely or tightly coupled integration scheme is realized by an extended KF (EKF). It is the method of choice for the blending of inertial data with GPS updates due to its optimal weighting schemes and it is provided below. This is also referred to as the core algorithm herein.

The KF estimates the state of a discrete-time controlled process governed by a linear stochastic difference equation. This condition of linearity cannot be satisfied all the time and for all applications. The integration of inertial data with GPS data using a KF is one of those cases when the system is non-linear due to the mechanization equations involved. It is however, not an isolated example and often the KF applications are non-linear in nature. Despite the non-linear problems, the KF has shown remarkable success in those circumstances.

For the non-linear navigation cases, the system can be linearized about a nominal trajectory during the design phase of the KF. For a general non-linear case when the nominal trajectory is not available, the process can be linearized about the current state. In case of the inertial data integration, the current state can be obtained by integrating the sensor output with respect to time using the mechanization process. A KF that involves linearization about the current state is referred to as an EKF.

Linearization

The navigation solution derived from the mechanization equations is a highly non-linear problem and, as such, cannot be used directly in the KF unless linearization is performed to make the system linear. Hence, one most important step involving a non-linear difference equation is the linearization. A simple dynamic non-linear stochastic difference equation for the process with state $x_k$ can be defined first. Here the subscript k refers to time epoch t $$x_k = f(x_{k-1}) + w_{k-1} \qquad 12$$

The non-linear difference equation given by the function $f$ relates the previous epoch state $x_{k-1}$ to the current epoch state $x_k$. The random variable $w_{k-1}$ is the dynamic process noise with $$E[w_k]=0$$

$$E[w_k w_j^T] = Q_k \text{ for } k=j \qquad 13$$

where $Q_k$ is the covariance matrix for the process noise. It can be estimated by computing the spectral density of the noise of different state vector components. Equation 12 is the simplest form of the non-linear difference equation. Similarly, the best situation would be when only the measurement ($z_k$) is related to the states with a non-linear functional relationship (h) and the noise ($v_k$) is uncorrelated and Gaussian distributed $$z_k = h(x_x) + v_k$$

$$E[v_k]=0 \qquad 14$$

$$E[v_k v_j^T] = R_k \text{ for } k=j \qquad 15$$

where $R_k$ is the variance covariance matrix for the measurement noise

For a highly non-linear model, the assumption of a linear measurement noise component may not be realistic. In this case, a better measurement model equation will be of the form $$z_k = h(x_k, v_k) \qquad 16$$

No matter if the noise is non-linear or linear, it cannot be estimated during the prediction step. Here it is assumed that the noise is Gaussian distributed, random with a zero mean. Because of the zero mean condition, this term can be left out from the prediction stage. After making the above changes, the state and measurement vector approximates, $\tilde{x}_k$ and $\tilde{z}_k$ are given as $$\tilde{x}_k = f(\hat{x}_{k-1}^-) \qquad 17$$

$$\tilde{z}_k = h(\tilde{x}_k) \qquad 18$$

As mentioned earlier, for EKF, the linearization is performed at the most recent epoch or current state. In this case, the current state would be the last available state vector ($\tilde{x}_{k-1}^-$). Taylor series expansion can be used for linearization as follows $$x_k \approx f(\tilde{x}_{k-1}^-) + \frac{\partial f}{\partial x}\bigg|_{\tilde{x}_{k-1}^-} (x_{k-1} - \hat{x}_{k-1}^-) + \frac{1}{2!}\frac{\partial^2 f}{\partial x^2}\bigg|_{\tilde{x}_{k-1}^-} (x_{k-1} - \hat{x}_{k-1}^-)^2 + \ldots + \langle w_{k-1}\rangle \qquad 19$$

The quantities $x_k$ and $x_{k-1}$ are the true state vectors. However, these quantities are not available directly as they can only be estimated. This kind of estimation will introduce errors, such as truncation errors. The Jacobian matrix $$\frac{\partial f}{\partial x}\bigg|_{\tilde{x}_{k-1}^-}$$

that propagates a previous state vector to the current is the partial derivative of the non-linear process function $f$ with respect to the elements of the state vector x evaluated about the estimate of the previous state ($\hat{x}_{k-1}^-$). For simplicity this Jacobian matrix will be referred to as $F_k$ for discrete time representation.

$$F_k = \frac{\partial f}{\partial x}\bigg|_{\hat{x}_{k-1}^-} \qquad 20$$

Another linearization is necessary if the measurement equation is also non-linear as discussed earlier.

$$z_k = \tilde{z}_k + \frac{\partial h}{\partial x}\bigg|_{\tilde{x}_k}(x_k - \tilde{x}_k) + \frac{1}{2!}\frac{\partial^2 h}{\partial x^2}\bigg|_{\tilde{x}_k}(x_k - \tilde{x}_k)^2 + \ldots + v_k \qquad 21$$

The measurement vector $z_k$ is the true measurement that may be available from the GPS receiver or any other aiding source. Even a physical relationship can be used as the measurement. For example, using the fact that a land vehicle cannot slide sideways and also it cannot jump up and down during its normal operation. These two physical constraints, commonly known as non holonomic constraint (NHC), can be translated into measurements when no other source of aiding is present. In this case, $z_k$ will consist of the two body frame velocity components in sideways and vertical direction of the vehicle, which from the physical constraint should be zero. The measurement equation is used to estimate the true value of the state vector $x_k$. The Jacobian matrix composed of the partial derivative of the measurement equation with respect to the state vector evaluated at the approximated current state $\tilde{x}_k$ will be $$H_k = \frac{\partial h}{\partial x}\bigg|_{\tilde{x}_k}.$$

For the EKF implementation, the first order approximation of the linearized dynamic process and measurement equations are used.

$$x_k \approx f(\hat{x}_{d-1}^-) + F_k(x_{k-1} - \hat{x}_{k-1}^-) \qquad 22$$

$$z_k = \tilde{z}_k + H_k(x_k - \tilde{x}_k) \qquad 23$$

Prediction

The first part of the EKF is to predict the state vector when the update measurements are not available. The prediction equations are also known as time update equations. Prediction equations not only estimate the state for the current epoch but also the uncertainty or accuracy of the states.

The dynamic process and measurement in terms of their respective errors are defined since the true state vector is not available. The predicted errors will be used to get the corrected trajectory $$\delta\tilde{x}_k = x_k - \tilde{x}_k \qquad 24$$

$$\delta\tilde{z}_k = z_k - \tilde{z}_k \qquad 25$$

Substituting equation 24 in equation 22 will give us the prediction equation for the error states.

$$\delta\hat{x}_k^- = F_k(x_{k-1} - \hat{x}_{k-1}^-) \qquad 26$$

The state error vector is given as follows:

$$\delta x_k = \begin{bmatrix} \delta\varphi \\ \delta\lambda \\ \delta h \\ \delta V^n \\ \delta V^e \\ \delta V^d \\ \varepsilon_x \\ \varepsilon_y \\ \varepsilon_z \\ b_g|_{3\times 1} \\ b_a|_{3\times 1} \\ sf_g|_{3\times 1} \\ sf_a|_{3\times 1} \\ b_c \\ d_c \end{bmatrix} \qquad 26(A)$$

where $\delta\phi$, $\delta\lambda$ and $\delta h$ are the position errors; $\delta V^n$, $\delta V^e$, $\delta V^d$ are the velocity errors; $\epsilon_x$, $\epsilon_y$, and $\epsilon_z$ are the errors in attitude; b and sf are the sensor bias and scale factor errors. The subscripts a and g represent the gyro and accelerometer, respectively. This comprises the loosely coupled state vector and if there are two additional states, clock bias ($b_c$) and clock drift ($d_c$), it will be the state vector for the tightly coupled integration scheme. Tightly coupled state vector may also include ambiguities terms for the available satellites if the carrier phase measurements are implemented for some high accuracy application.

The dynamic or state transition matrix $F_k$ for loosely coupled integration scheme is provided below:

$$F_k = I_{21\times 21} + \begin{bmatrix} f_1 & f_2 & 0_{3\times 3} & 0_{3\times 3} & 0_{3\times 3} & 0_{3\times 3} & 0_{3\times 3} \\ f_3 & f_4 & f_5 & 0_{3\times 3} & R_b^l & 0_{3\times 3} & R_b^l\mathrm{diag}(f^b) \\ f_6 & f_7 & f_8 & R_b^l & 0_{3\times 3} & -R_b^l\mathrm{diag}(\omega_{ib}^b) & 0_{3\times 3} \\ 0_{3\times 3} & 0_{3\times 3} & 0_{3\times 3} & f_9 & 0_{3\times 3} & 0_{3\times 3} & 0_{3\times 3} \\ 0_{3\times 3} & 0_{3\times 3} & 0_{3\times 3} & 0_{3\times 3} & f_{10} & 0_{3\times 3} & 0_{3\times 3} \\ 0_{3\times 3} & 0_{3\times 3} & 0_{3\times 3} & 0_{3\times 3} & 0_{3\times 3} & f_{11} & 0_{3\times 3} \\ 0_{3\times 3} & 0_{3\times 3} & 0_{3\times 3} & 0_{3\times 3} & 0_{3\times 3} & 0_{3\times 3} & f_{12} \end{bmatrix} dt \qquad 26(B)$$

Where $$f_1 = \begin{pmatrix} 0 & 0 & -\dfrac{V^n}{(M+h)} \\ \dfrac{V^e \sin\varphi}{(N+h)\cos^2\varphi} & 0 & -\dfrac{V^e}{(N+h)^2\cos\varphi} \\ 0 & 0 & 0 \end{pmatrix},$$

-continued $$f_2 = \begin{pmatrix} \dfrac{1}{M+h} & 0 & 0 \\ 0 & \dfrac{1}{(N+h)\cos\varphi} & 0 \\ 0 & 0 & -1 \end{pmatrix}$$

$$f_3 = \begin{bmatrix} 2V^e\omega^e\cos\varphi - \dfrac{(V^e)^2}{(N+h)\cos^2\varphi} & 0 & \dfrac{-V^nV^d}{(M+h)^2} + \dfrac{(V^e)^2\tan\varphi}{(N+h)^2} \\ 2\omega^e(V^n\cos\varphi - V^d\sin\varphi) + \dfrac{V^eV^n}{(N+h)\cos^2\varphi} & 0 & \dfrac{-V^eV^d}{(N+h)^2} - \dfrac{V^nV^e\tan\varphi}{(N+h)^2} \\ 2\omega^e\sin\varphi V^e & 0 & \dfrac{(V^e)^2}{(N+h)^2} + \dfrac{(V^n)^2\tan\varphi}{(M+h)^2} - \dfrac{2\gamma}{(R+h)} \end{bmatrix},$$

$$f_4 = \begin{bmatrix} \dfrac{V^d}{M+h} & -2\omega^e\sin\varphi - 2\dfrac{V^e\tan\varphi}{N+h} & \dfrac{V^n}{M+h} \\ 2\omega^e\sin\varphi + \dfrac{V^e\tan\varphi}{N+h} & \dfrac{V^d + V^n\tan\varphi}{N+h} & 2\omega^e\cos\varphi + \dfrac{V^e}{N+h} \\ -\dfrac{2V^n}{M+h} & -2\omega^e\cos\varphi - \dfrac{2V^e}{N+h} & 0 \end{bmatrix},$$

$$f_5 = \begin{bmatrix} 0 & f_d & -f_e \\ -f_d & 0 & f_n \\ f_e & -f_n & 0 \end{bmatrix},$$

$$f_6 = \begin{bmatrix} -\omega^e\sin\varphi & 0 & -\dfrac{V^e}{(N+h)^2} \\ 0 & 0 & \dfrac{V^n}{(M+h)^2} \\ -\omega^e\cos\varphi - \dfrac{V^e\sec^2\varphi}{(N+h)} & 0 & \dfrac{V^e\tan\varphi}{(N+h)^2} \end{bmatrix},$$

$$f_7 = \begin{bmatrix} 0 & \dfrac{1}{N+h} & 0 \\ -\dfrac{1}{M+h} & 0 & 0 \\ 0 & -\dfrac{\tan\varphi}{N+h} & 0 \end{bmatrix},$$

$$f_8 = \begin{bmatrix} 0 & \dfrac{V^e\tan\varphi}{N+h} + \omega^e\sin\varphi & -\dfrac{V^n}{M+h} \\ -\dfrac{V^e\tan\varphi}{N+h} - \omega^e\sin\varphi & 0 & -\dfrac{V^e}{N+h} - \omega^e\cos\varphi \\ \dfrac{V^n}{M+h} & \dfrac{V^e}{N+h} + \omega^e\cos\varphi & 0 \end{bmatrix},$$

$$f_9 = \begin{bmatrix} -\alpha_g & 0 & 0 \\ 0 & -\alpha_g & 0 \\ 0 & 0 & -\alpha_g \end{bmatrix}, f_{10} = \begin{bmatrix} -\alpha_a & 0 & 0 \\ 0 & -\alpha_a & 0 \\ 0 & 0 & -\alpha_a \end{bmatrix}$$

$$f_{11} = \begin{bmatrix} -\alpha_{gSF} & 0 & 0 \\ 0 & -\alpha_{gSF} & 0 \\ 0 & 0 & -\alpha_{gSF} \end{bmatrix}, f_{12} = \begin{bmatrix} -\alpha_{aSF} & 0 & 0 \\ 0 & -\alpha_{aSF} & 0 \\ 0 & 0 & -\alpha_{aSF} \end{bmatrix}$$

Matrices $f_9$ to $f_{11}$ are composed of sensor error parameters that can be modeled as random walk, random constant, Gauss-Markov, etc. As an example, the matrices shown above are modeled as first order Gauss-Markov processes with the following general relationship: $b = -\alpha b + \sqrt{2\alpha\sigma^2}$ where $\alpha$ is the correlation time $\sigma$ is the noise standard deviation for the sensor. The matrix $f_5$ is the skew symmetric representation of the bias and scale factor compensated forces in local level frame.

For the tightly coupled clock error states will be added to the state transition matrix. In this specific case, the receiver clock bias is modeled as random walk process: $b_c(t) = b_c(t-1) + (d_c(t))dt$ where $d_c$ is the random constant error for the clock drift for each time step $d_c(t) = d_c(t-1)$.

Therefore, the transition matrix for the clock bias and drift errors can be written as $$f_{13} = \begin{bmatrix} 1 & dt \\ 0 & 1 \end{bmatrix} \quad 26(C)$$

Combining all the above stated components will give the transition matrix for the tightly coupled integration scheme.

$$F_k^{tightly} = \begin{bmatrix} F_k & 0_{21 \times 2} \\ 0_{2 \times 21} & f_{13} \end{bmatrix} \quad 26(D)$$

This is the first step in prediction and surely the second step is the propagation of the error covariance matrix (P) to the next epoch. The estimate of the error $\delta \tilde{x}_k$ can then be used after some manipulation to estimate the true state vector which was not directly available. The errors are also assumed to follow Gaussian probability density function, that is $E(\delta \tilde{x}_k) = 0$ and $E(\delta \tilde{x}_k \delta \tilde{x}_k^T) = P_k^-$. From this basic expectation, a compact mathematical relationship to calculate the expected variance covariance of the error states can be derived. After substituting the value of the $\delta \tilde{x}_k$ in the basic expectation equation and using mathematical identities, the a-priori covariance equation can be written as $$P_k^- = F_k P_{k-1} F_k^T + Q_{k-1} \quad 27$$

Update Equations

Similarly, manipulation of the update equation given in equation 23 will yield to the measurement error equation.

$$\delta \tilde{z}_k = H_k \delta \hat{x}_k^- + V_k v_k \quad 28$$

where for loosely coupled integration the values are defined as $$\delta \tilde{z}_k = \begin{bmatrix} \phi_{INS} - \phi_{GPS} \\ \lambda_{INS} - \lambda_{GPS} \\ h_{INS} - h_{GPS} \\ v_{INS}^t - v_{GPS}^t |_{3 \times 1} \end{bmatrix} \quad 29$$

$$H_k = \begin{bmatrix} 1 & 0 & 0 & & \\ 0 & 1 & 0 & 0_{3 \times 3} & 0_{3 \times 15} \\ 0 & 0 & 1 & & \\ & 0_{3 \times 3} & & I_{3 \times 3} & 0_{3 \times 15} \end{bmatrix} \quad 30$$

where subscript INS and GPS refer to the parameters computed from INS and GPS respectively The measurement equation for n available satellites for tightly coupled integration can be written as:

$$\delta z_k = \begin{bmatrix} \rho_{INS,1}^k - \tilde{\rho}_{GPS,1}^k \\ \vdots \\ \rho_{INS,n}^k - \tilde{\rho}_{GPS,n}^k \\ \dot{\rho}_{INS,1}^k - \dot{\tilde{\rho}}_{GPS,1}^k \\ \vdots \\ \dot{\rho}_{INS,n}^k - \dot{\tilde{\rho}}_{GPS,n}^k \end{bmatrix} \quad 31$$

Where $\rho_{INS,j}^k$ is the computed pseudorange using INS measurements for the $j^{th}$ satellite and $\dot{\rho}_{INS,j}^k$ is the INS computed range rate for the $j^{th}$ satellite and are computed as follows.

$$\rho_{INS,i}^k = \sqrt{(x_R^k - x_{sat,i}^k)^2 + (y_R^k - y_{sat,i}^k)^2 + (z_R^k - z_{sat,i}^k)^2} + b_c + \varepsilon$$

and $$\dot{\rho}_{INS,i}^k = L_{x,i}^k(v_{xR}^k - v_{xsat,i}^k) + L_{y,i}^k(v_{yR}^k - v_{ysat,i}^k) + L_{z,i}^k(v_{zR}^k - v_{zsat,i}^k) + d_c + \varepsilon$$

where $x_{R,i}^k, y_{R,i}^k$ and $z_{R,i}^k$ are receiver coordinates in e-frame
$x_{sat,i}^k, y_{sat,i}^k$ and $z_{sat,i}^k$ are satellite coordinates in e-frame
$\varepsilon$ is noise
$\lambda_{L1} = $ L1 carrier wavelength $= 1/f_{L1}$, $\dot{\tilde{\rho}}_{GPS,i}^k = -(c/f_{L1}) f_{dopp_i}^k$ and c is the speed of light.

$$\text{and } \begin{bmatrix} L_{x,i}^k \\ L_{y,i}^k \\ L_{z,i}^k \end{bmatrix} = \bar{L}_i^k = \begin{bmatrix} \dfrac{x_R^k - x_{sat,i}^k}{\|\bar{r}_R^k - \bar{r}_{sat,i}^k\|} \\ \dfrac{y_R^k - y_{sat,i}^k}{\|\bar{r}_R^k - \bar{r}_{sat,i}^k\|} \\ \dfrac{z_R^k - z_{sat,i}^k}{\|\bar{r}_R^k - \bar{r}_{sat,i}^k\|} \end{bmatrix},$$

$$\bar{r}_R^k = [x_R^k \; y_R^k \; z_R^k]^T,$$

$$\bar{r}_{sat,i}^k = [x_{sat,i}^k \; y_{sat,i}^k \; z_{sat,i}^k]^T$$

$\tilde{\rho}_{INS,j}^k$ and $\dot{\tilde{\rho}}_{INS,j}^k$ are the corrected pseudorange and Doppler for the $j^{th}$ satellite.

The measurement matrix for the tightly coupled system is as follows:

$$H_k = \begin{bmatrix} (L_1^e)^T & 0_{1 \times 3} & 0_{1 \times 15} & 1 & 0 \\ \vdots & \vdots & \vdots & \vdots & \vdots \\ (L_n^e)^T & 0_{1 \times 3} & 0_{1 \times 15} & 1 & 0 \\ 0_{1 \times 13} & (L_1^l)^T & 0_{1 \times 15} & 0 & 1 \\ \vdots & \vdots & \vdots & \vdots & \vdots \\ 0_{1 \times 3} & (L_n^l)^T & 0_{1 \times 15} & 0 & 1 \end{bmatrix} \quad 34$$

Where $$L_l^e = \begin{bmatrix} -(N+h)\sin\varphi\cos\lambda & -(N+h)\sin\varphi\sin\lambda & (N(1-e^2)+h)\cos\varphi \\ -(N+h)\cos\varphi\sin\lambda & (N+h)\cos\varphi\cos\lambda & 0 \\ \cos\varphi\cos\lambda & \cos\varphi\sin\lambda & \sin\varphi \end{bmatrix} \overline{L}_i^k,$$

$$L_i^l = \begin{bmatrix} -\sin\varphi\cos\lambda & -\sin\varphi\sin\lambda & \cos\varphi \\ -\sin\lambda & \cos\lambda & 0 \\ \cos\varphi\cos\lambda & \cos\varphi\sin\lambda & \sin\varphi \end{bmatrix} L_i^k,$$

and e is the eccentricity of the Earth's ellipsoid.

The Kalman gain yields the minimum mean-squared error (MMSE) estimate and is known as the optimal Kalman gain. If a linear blending factor $K_k$ is used for a new measurement, the following relationship can be established between the predicted state and the measurement $$\delta \hat{x}_k^+ = \delta \hat{x}_k^- + K_k(\delta \tilde{z}_k - H_k \delta \hat{x}_k^-) \qquad 35$$

The a posteriori covariance for the state vector can now be estimated in a similar fashion as for the a-priori covariance.

$$P_k^+ = P_k^- - K_k H_k P_k^- - P_k^- H_k^T K_k^T + K_k(R_k + H_k P_k^- H_k^T) K_k^T \qquad 36$$

The equation 37 is general equation for any arbitrary gain matrix. The optimal gain with MMSE of the covariance matrix can be obtained by minimizing the trace of $P_k^+$ which is equivalent to taking the partial derivative of the matrix $P_k^+$ with respect to the gain and setting it to zero.

$$\frac{\partial P_k^+}{\partial K_k} = -2(H_k P_k^-)^T + 2K_k(R_k + H_k P_k^- H_k^T) \qquad 37$$
$$= 0 \Rightarrow P_k^- H_k^T$$
$$= K_k(R_k + H_k P_k^- H_k^T)$$

and $$K_k = P_k^- H_k^T (R_k + H_k P_k^- H_k^T)^{-1}$$

Substitution of Kalman gain in equation 36 will reduce this equation as follows:

$$P_k^+ = P_k^- + \underbrace{P_k^- H_k^T (R_k + H_k P_k^- H_k^T)^{-1}}_{K_k} H_k P_k^- \qquad 38$$

$$P_k^+ = (I - K_k H_k) P_k^-$$

As previously stated, the present MPIRC device and method may provide a seamless solution—that is, it is produced continuously even though the GNSS or ranging signals may temporarily be inoperative.

Optionally, magnetometers 8 may be used to provide heading and pressure sensor, such as a barometer 9 may be used to provide height. The magnetometer 8 derived heading ($\Psi$) is provided in equation 39, where Hx and Hy are the horizontal magnetic field measurements from the magnetometer, or the horizontal magnetic field measurements after tilt compensation either from accelerometers or from the pitch and roll angles of the navigation solution:

$$\Psi = \arctan(H_y/H_x) \qquad 39$$

The height difference may be calculated using equation 40:

$$h = \left(\frac{R}{g}\right) T \ln\left(\frac{p_o}{p}\right) \qquad 40$$

where R is the gas constant, g is the acceleration due to gravity and T is the average temperature between the two pressure layers $p_o$ and p.

Optionally, if the readings from the receiver of absolute navigational information (such as GNSS readings) are available and adequate, such navigational information may be used to derive heading of the moving platform including the MPIRC module (such as for example, heading derived using instantaneous velocity values from the GNSS information).

Where absolute measurements are not available, however, ranging measurements and navigation state can be used to limit the drift related errors when using INS. To give an idea about such errors, several time dependent INS drift errors are provided in equation 41 below:

$$\delta p_k = \delta p_0 + \delta v_0 \Delta t + \delta b_0^a \frac{\Delta t^2}{2} + \delta b_0^g g \frac{\Delta t^3}{6} + \qquad 41$$
$$\delta \theta_0^{r,p} g \frac{\Delta t^2}{2} + \ldots + \delta \theta_0^A V \Delta t + \delta_0^{SFa} \frac{\Delta t^2}{2} + \delta_0^{SFg} g \frac{\Delta t^3}{6} + \ldots$$

The terms in this equation are defined as,
$\delta p_0$ the positional error drift after time t
$\delta p_0$ the initial position error at the start of the outage
$\delta v_0$ the initial velocity error at the start of the outage
$\Delta t$ the time difference between the start of the outage and the current time
$\delta b_0^a$ the accelerometer offset bias at the beginning of the outage
$\delta b_0^g$ the gyroscope offset bias at the beginning of the outage
g the local gravity constant
$\delta \theta_0^{r,p}$ the nonorthogonality error due to roll or pitch errors at the beginning of the outage
$\delta \theta_0^A$ the nonorthogonality error due to azimuth errors at the beginning of the outage
V the average velocity during the outage
$\delta_0^{SFa}$ the accelerometer scale factor error at the beginning of the outage in specific force [m/s$^2$]
$\delta_0^{SFg}$ the gyroscope scale factor error at the beginning of the outage [rad/s]

The time dependent INS drift errors can be reduced using ranging updates and a filter updated or weighted solution between the INS and ranging signals.

Regardless of the presence or absence of absolute navigational information of the MPIRC modules, the navigation solution obtained from the readings relating to navigational information from the sensor assembly 3 of the first module 10 can be improved by incorporating the distance or range information from a second module 20 along with the navigation state of the second module 20, wherein the distance or range information and the navigation state of the second module 20 may be obtained through the transceiver 12. The foregoing information can be incorporated using any number of different techniques such as, for example, by using a least squares estimation or using the range measurement within the navigation filter as a tightly coupled measurement update. Such scenarios are described for 2D navigation case in Example 1 and for 3D navigation case in Example 2.

Optionally, there may be a physical link between two or more MPIRC-enabled modules (see FIGS. 5-10). A physical link may be rigid, or non-rigid, or flexible. The presence of a physical link will add kinetic constraints that may be used to further constrain the navigation solution, which will enhance the solution, especially if the absolute navigation information is not available, degraded, or blocked. For instance, Example 3 herein demonstrates cases having the presence of a rigid link or links. Such rigid link(s) between two or more modules may be found in agriculture equipment or other articulated platforms. Example 3 demonstrates the case of two platforms linked by a rigid link, and Example 4 demonstrates the case of two modules linked with flexible or non-rigid link, such type of link may be found, for example, in towed submerged underwater equipment, such as sonobuoys. For demonstration purposes only, the case of a floating platform linked by a non-rigid or flexible link to a submerged platform is shown in Example 4.

It is contemplated that if one or more modules 10 are not equipped to obtain or are unable to obtain absolute navigational information, but the one or more modules 10 are within the reach of a base station 20 (i.e. a platform, whether moving or stationary, that can obtain absolute navigational solution), the present method can be applied to the one or more rovers 10 to enhance their navigation solution. The same concept applies to any such one or more rover devices 10 that do not obtain absolute navigational information, and are not within reach of the base station 20, but are within reach of at least one or more other rovers 10 that are in turn within reach of the base station 20. The same concept may go on as a chain. The enhancement provided will get weaker when the chain get deeper, but still some enhancement can be achieved over pure sensor navigation.

It is further contemplated that if the present MPIRC-enabled module operates on two or more platforms that can play the role of base station or rover, and may interchange their roles depending on absolute navigational information (such as GNSS) availability, and if for a duration of time there is no absolute navigational information on either platform, the solution can still be enhanced by using the transceiver 12 of each MPIRC-enabled module 10 and the ranging information communicated between the modules (10 and 20), to constrain the drift of sensor navigation of both modules in some cases (for example drift in opposite directions). This constraint may improve the sensor only navigation solution in some scenarios.

It is further contemplated that if the transceiver 12 in an MPIRC-enabled module is a wireless transceiver, it may be amended with appropriate antennas and/or techniques to obtain the angle of arrival (AOA) of the incoming signal, not just the range between transmitter and receiver. This additional piece of information can be further used to enhance the navigation solution by providing more constraints.

It is further contemplated that if the transceiver 12 of an MPIRC module is a wireless transceiver, it may be augmented with multipath mitigation techniques or equipments.

It is further contemplated that if the transceiver 12 of an MPIRC module is a wireless transceiver, the present MPIRC module 10 might obtain wireless information from at least one other MPIRC-enabled modules on other platforms (whether moving or stationary) that have absolute navigation information available. This will provide more measurements, i.e. more range constraints, or possibly more AOA constraints if they are available. With three or more ranges the solution reverts to trilateration.

It is further contemplated that a present MPIRC-enabled module may improve reacquisition time of the absolute navigation information such as for example reducing the time to first fix after a GNSS signal outage for a quick position and velocity estimation of the "rover device" by reducing the search space.

It is further contemplated that if a MPIRC-enabled platform (containing a first module 10) is linked to another MPIRC-enabled platform (containing a second module 20), and that if the link was rigid, the known link length can be used to constrain the navigation solution, this will benefit especially if one of the platforms does not have absolute navigational information (such as GNSS) or if this information is degraded or blocked. Furthermore, if the link is rigid, but with rotating joints (whether having joints both sides of the link on the two platforms or a joint in the side of only one platform and the link is welded to the other platform), the joints may have sensors, such as encoders or potentiometers, to obtain the angle of rotation of the link with respect to the platforms.

It is further contemplated that if an MPIRC-enabled platform (containing a first module 10 is linked to another MPIRC-enabled platform (containing a second module 20), and that if the link is non-rigid or flexible, sensors that measure the tension in the link may be used to detect any bends in the link to obtain an improved estimate of the Euclidean distance between the two platforms (this distance is less than the link length and the difference depends upon the bend in the link).

It is further contemplated that the present MPIRC system can be used with any type of state estimation technique or filtering technique, for example, linear or non-linear techniques alone or in combination.

It is further contemplated that the present MPRIC system may have a means for obtaining speed or velocity information, such as for example an odometer, wheel encoders in case of wheel-based platforms, motor or shaft encoders in case of track-based platforms, or Doppler readings from a transceiver that can be used to calculate velocities.

It is further contemplated that the present MPIRC system can be used with other sensor combinations, not just those used and described herein. For example, the optional modules can be used with navigation solutions relying on a 2D dead reckoning solution using a gyroscope and means of obtaining vehicle speed or wheel speeds, a 2D navigation solution based on two accelerometers and one gyroscope, a full IMU giving a 3D navigation solution, a 3D navigation solution based on one gyroscope, two or three accelerometers, and means of speed or velocity readings, a 3D navigation solution based on one gyroscope and three accelerometers, or any other sensor combination from the sensors assembly (including accelerometers, gyroscopes, barometers, magnetometers, or other), or means of speed or velocity readings. It is further contemplated that the present MPIRC system can work together with a conveyance algorithm or a mode detection algorithm for using the composite absolute and relative navigational information to establish the mode of conveyance, if the integrated navigation device is a portable navigation device.

It is further contemplated that the present MPIRC system may have a routine to calculate misalignment between the sensor assembly of the module (i.e. the device, especially if the device is a portable navigation device) and the moving platform (such as for example, person or vehicle). If the device is non-tethered the misalignment module will run regularly to detect and estimate any changing misalignment that can vary with time. This misalignment may be used to improve the navigation solution of the moving platform.

It is further contemplated that the present MPIRC system can work together with a routine to detect if a module is stationary, where the navigation core algorithm is aided by the physical state of the platform which is stationary with zero velocity (which is called Zero velocity update (zupt)). Whether the platform is stationary or not may be detected through inertial sensor readings, or through means of speed or velocity readings if available, or through other sensors, or through a combination thereof. When zupt updates are used, the algorithm applies no motion as updates to improve the navigation solution. Furthermore these zupt periods can be used for recalculation of inertial sensors biases.

It is further contemplated that the present MPIRC system may use appropriate constraints on the motion of the platform such as adaptive Non-holonomic constraints, for example, those that keep a platform from moving sideways or vertically jumping off the ground. These constraints can be used as an explicit extra update or implicitly in case having means of speed readings when projecting speed to perform velocity updates.

It is contemplated that the present MPIRC system can work with any helper optional modules such as, for example, modules for advanced modeling and/or calibration of inertial sensors errors, the derivation of possible measurement updates for them from GNSS when appropriate, the automatic assessment of GNSS solution quality and detecting degraded performance, automatic switching between loosely and tightly coupled integration schemes, and automatic assessment of each visible GNSS satellite when in tightly coupled mode.

It is further contemplated that the present MPIRC system can be used together with modeling and/or calibration for the other sensors in the sensor assembly 3, such as, for example the barometer 9 and magnetometer 8, or for the errors in the speed or velocity readings if available.

It is further contemplated that the other sensors in the sensor assembly 3 such as, for example, the barometer 9 (altitude information) and magnetometer 8 (heading information) can be used in one or more of different ways such as: (i) as control inputs to the system model of the filter; (ii) as measurement updates to the filter either by augmenting the measurement model or by having an extra update step; (iii) in the above contemplated routine for automatic GNSS degradation checking; (iv) in the above contemplated alignment procedure; (v) in the above contemplated misalignment procedure.

It is further contemplated that the sensor assembly 3 can be either tethered or non-tethered to the moving platform.

It is further contemplated that the present MPIRC system can be further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, laser range finders, cameras and vision systems, or sonar systems. These new systems can be used either as an extra aid to enhance the accuracy of the navigation solution during the absolute navigation information problems (degradation or denial), or they can totally replace the absolute navigation information in some applications.

It is further contemplated that the present MPIRC system, when working in a tightly coupled scheme need not to be bounded to utilizing pseudorange measurements (which are calculated from the code not the carrier phase, thus they are called code-based pseudoranges) and the Doppler measurements (used to get the pseudorange rates). The carrier phase measurements of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancements is the carrier-smoothed pseudorange.

It is further contemplated that the present MPIRC system can also be used in a system that implements an ultra-tight integration scheme between a GNSS receiver and the other sensors and speed readings.

It is further contemplated that the present MPIRC system can be used with various wireless communication systems that can be used for positioning and navigation either as an additional aid (that will be more beneficial when GNSS is unavailable) or as a substitute for the GNSS information (e.g. for applications where GNSS is not applicable). Examples of these wireless communication systems used for positioning are, such as, those provided by cellular phone towers, radio signals, television signal towers, WiFi, or Wimax. For example, for cellular phone based applications, an absolute coordinate from cell phone towers and the ranges between the indoor user and the towers may utilize the methodology described herein, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. For example, for WiFi positioning applications different methods might be used with different accuracies, such as for example, time of arrival, time difference of arrival, angles of arrival, received signal strength, and fingerprinting techniques. The above mentioned ideas, among others, are also applicable in a similar manner for other wireless positioning techniques based on wireless communications systems.

It is further contemplated that another enablement of the disclosed technology can be achieved by using RFIDs in the module (such as for example using RFIDs in a cell phone). The RFID derived range between two modules (for example two cell phones) where one with access to the absolute updates from the receiver of absolute navigational information (such as GNSS) can provide the coordinates and distance measurements. The presence of an RFID at a known location (such as at the entrance of a building or a certain place in a mine) and in the module (for example cell phone) will also be sufficient to use the technology described herein.

It is contemplated that the present navigation module 1 and method can use various types of inertial sensors, other than MEMS based sensors described herein by way of example.

Without any limitation to the foregoing, the present navigation module 1 and method of determining a real-time navigation solution are further described by way of the following examples.

EXAMPLES

Example 1

Horizontal 2D Ranging Updates

Figure 3:
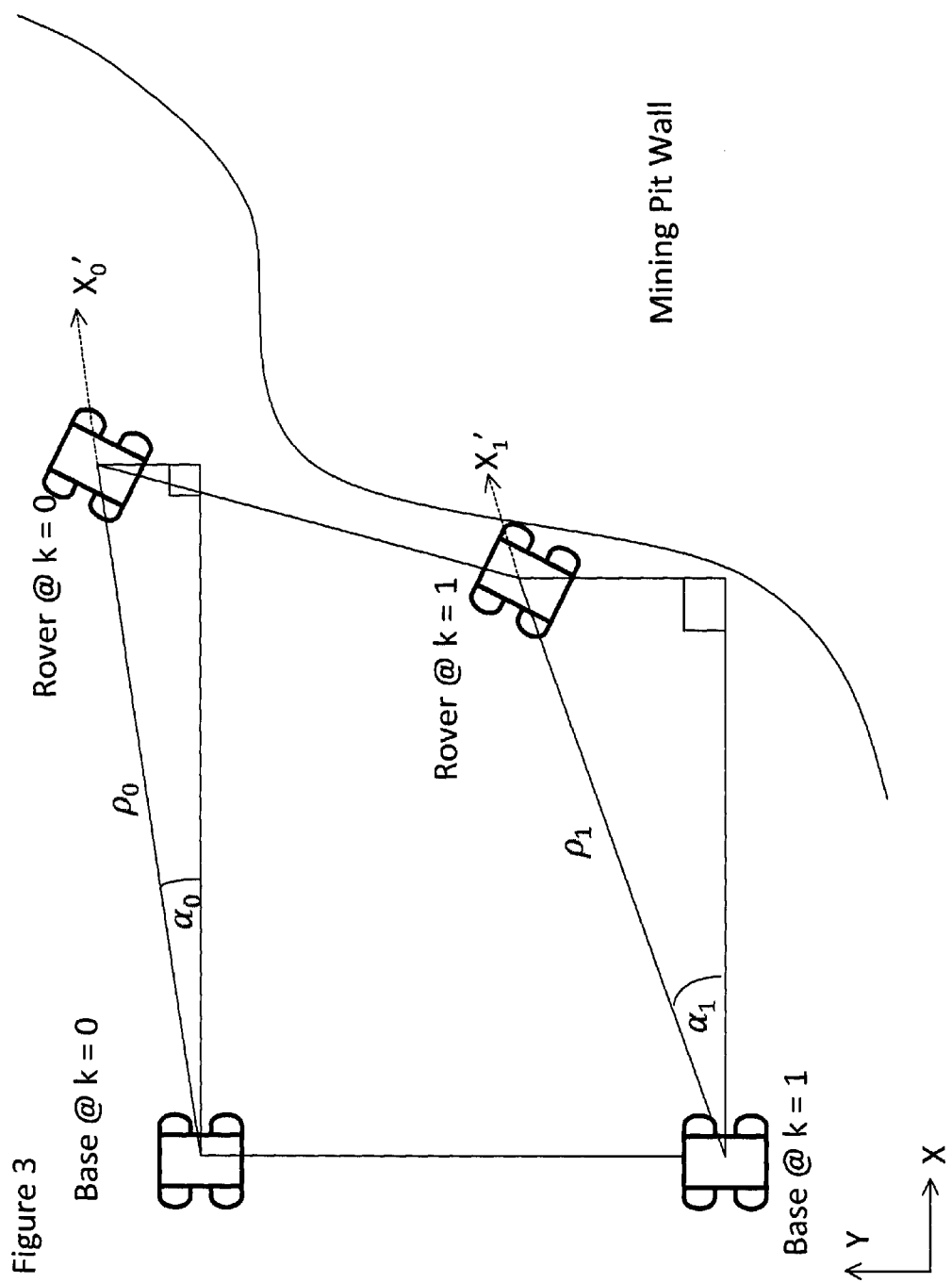
FIG. 3 is a diagram of the geometric relationship (either in 2D case or in the top view of the horizontal relationship in 3D case) between two platforms (one of which is the base station the other is the rover) at two time epochs, at the second of which the rover navigates without absolute GNSS updates.

A 2D example in a horizontal Local Level Frame plane for 2 moving platforms, such as for example two vehicles, is provided (see FIG. 3). The example is given for navigation of a rover platform without absolute position updates:

1) The base station is defined as the location of known absolute coordinates with standard deviation $\sigma_k^B$ where k denotes the time epoch and B denotes base station. This base station location may be stationary or non-stationary (i.e. moving). The standard deviation of the base station position is either dependent on the method of absolute positioning used or the standard deviation coming from the integrated navigation solution of the module on the base station platform. For example, if good GNSS is used alone or in the integrated solution this position may be known, for example, to within 1 meter or better. The coordinates of the base station may be constant as in the case if the base station is stationary or it may be changing if the base station is moving.

The coordinates in this example are Cartesian and are referenced to a starting point within a Local Level Frame, the coordinates then could be for example North and East, from an initial latitude and longitude (this initial point is the origin of the Cartesian coordinate frame under consideration).

$$North_k = (\phi_k - \phi_0)^*(M + h_0)$$

$$East_k = (\lambda_k - \lambda_0)^*(N + h_0)^*\cos(\phi_0)$$

To simplify the terminology x and y are interchangeably used with East and North.

The coordinates will be referred to as:
$(x_k^B, y_k^B)$ $\sigma_k^B$ for any time epoch k, and
$(x_0^B, y_0^B)$ $\sigma_0^B$ for time epoch 0.

2) Consider the rover platform to have an absolutely known location at time epoch 0 with coordinate standard deviation of $\sigma_0^R$. The coordinates (Cartesian coordinates defined from the same origin point as described above for the base station) with their standard deviation are written as $(x_0^R, y_0^R)$ $\sigma_0^R$ Immediately after time 0, the rover platform begins navigation without absolute position updates and is forced to position itself using INS-only predicted positions. From time epoch 0 to time epoch 1 the platform navigates with a position error that grows with time as given in equation 41. At time epoch 1, the standard deviation $\sigma_1^R$ will be because of the addition of time dependent mechanization position errors and the previous standard deviation $\sigma_0^R$. The new predicted coordinates and standard deviation can be written as:

$$(x_1^R, y_1^R)\sigma_1^R$$

3) At time epoch 1 the rover truck receives a range (distance) and coordinate measurement $((x_1^B, y_1^B)$ $\sigma_1^B)$ from the base station platform (which may or may not have moved). The measured range $\rho_1^m$ will have errors due to $\sigma_1^B$ and ranging system inaccuracies $\sigma_1^{range}$ $$\rho_1^m = \rho_1^{true} + e(\sigma_1^B) + e(\sigma_1^{range}) \qquad 42$$

Where e(.) denotes the error associated with the respective standard deviation.

4) Using the predicted rover coordinates $(x_1^R, y_1^R)$ at time epoch 1 from the INS-only navigation solution, another distance or range measurement can be computed between the rover predicted INS coordinates and the known base station coordinates as follows:

$$\rho_c^1 = \sqrt{(x_1^R - x_1^B)^2 + (y_1^R - y_1^B)^2} \qquad 43$$

The standard deviation of this computed range depend on the standard deviations of the base station and INS-predicted rover coordinates, the latter is determined directly from the output of the navigation filter on the rover module. This combined standard deviation is referred to as $\sigma_1^c$.

5) A right angle triangle can be formed between the base station and rover platform by using position coordinates of each of the base and rover platforms (FIG. 3). The base station displacement can be determined from absolute navigation information or integrated navigation information and will have variance $\sigma_1^B$. The rover platform error will be dependent on the position error accumulated from time epoch 0 to time epoch 1 and the original rover coordinate errors at time epoch 0.

6) The concept of the right angle triangle was introduced in 5) to visualize the central angle ($\alpha$), which may be used in the coordinate updates. The angle can be determined by using equation 44 without calculating the right angle triangle.

$$\alpha_1 = \tan^{-1}\left(\frac{y_1^R - y_1^B}{x_1^R - x_1^B}\right) \qquad 44$$

7) One possible solution to benefit from the measured range $\rho_1^m$ in is to combine it with the calculated range $\rho_1^c$ to form a single range at time epoch 1 using weighted least squares as follows:

$$\rho_1^w = \rho_1^m\left(\frac{\sigma_1^c}{\sigma_1^c + \sigma_1^{range}}\right) + \rho_1^c\left(\frac{\sigma_1^{range}}{\sigma_1^c + \sigma_1^{range}}\right) \qquad 45$$

Using the range computed in equation 45, a new set of rover coordinates $(\tilde{x}_1^R, \tilde{y}_1^R)$ are computed that has reduced errors in comparison to the mechanization-only coordinates. These new values may be used in the navigation filter as measurement updates. The formula to compute this new set of coordinates is provided below:

$$\tilde{x}_1^R = \rho_1^w \cos\alpha_1 + x_1^B$$

$$\tilde{y}_1^R = \rho_1^w \sin\alpha_1 + y_1^B \qquad 46$$

This process (steps 2-7) is repeated for each time epoch and improves the navigation accuracies, especially during the absence of other absolute position updates such as GNSS. In the long-term the rover position will tend to drift linearly with respect to time, as opposed to cubically as in Equation 41.

8) Another possible solution to benefit from the measured range $\rho_k^m$ and to enhance the INS solution is to use this range information within the navigation filter as a tightly coupled measurement update, using the following:

$$\delta z_k = \rho_k^c - \rho_k^m \qquad 47$$

$$H_k = \begin{bmatrix} (\bar{L}_k)^T & S & 0_{1\times 18} & 1 & 0 \end{bmatrix} \qquad 48$$

where $\begin{bmatrix} L_k^x \\ L_k^y \end{bmatrix} = \bar{L}_k = \begin{bmatrix} \dfrac{x_k^R - x_k^B}{\|\bar{r}_k^R - \bar{r}_k^B\|} \\ \dfrac{y_k^R - y_k^B}{\|\bar{r}_k^R - \bar{r}_k^B\|} \end{bmatrix}$, $\bar{r}_k^R = [x_k^R \ y_k^R]^T, \bar{r}_k^B = [x_k^B \ y_k^B]^T$ and $S = \begin{bmatrix} 0 & (N+h_0)\cos\varphi_0 \\ M+h_0 & 0 \end{bmatrix}$ This Example 1 is also valid if a rover platform is tracked by a base station. In this case, all the equations remain the same and the only difference is sending the rover coordinates $((x_1^R, y_1^R)$ $\sigma_1^R)$ information to the base station along with the ranging information.

Example 2-3D

Ranging Updates

Figure 4:
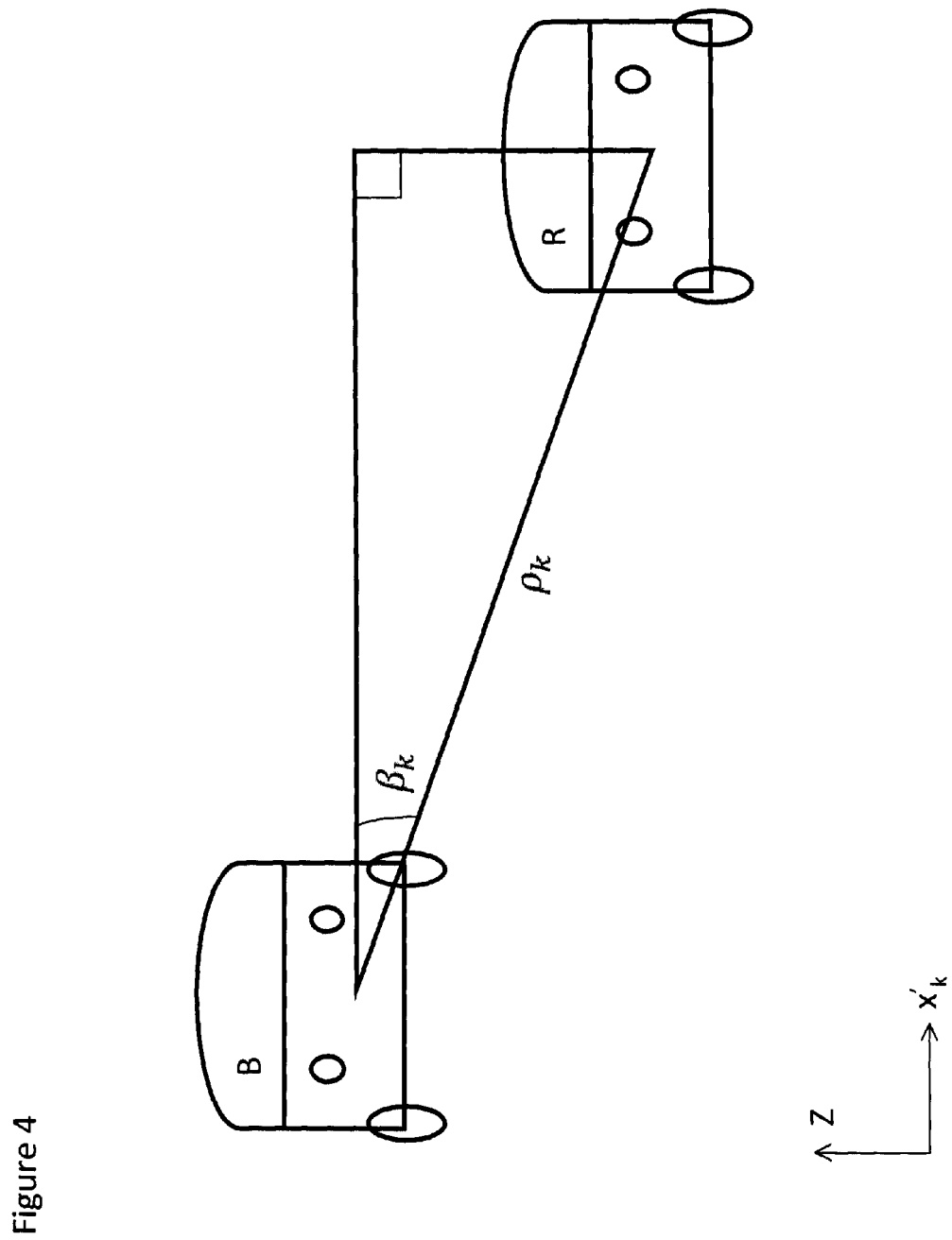
FIG. 4 is a diagram of the geometric relationship in the vertical direction between two platforms (one of which is the base station and the other is the rover) at any time epoch (front or side view 3D example at epoch k)

A 3D example for 2 moving platforms, such as for example two vehicles, is provided (see FIG. 3 and FIG. 4). The example is given for navigation of a rover platform without absolute position updates, similar to Example 1.

1) The base station is defined as the 3D location of known absolute coordinates with standard deviation $\sigma_k^B$ where k denotes the time epoch and B denotes base station. This base station location may be stationary or non-stationary (i.e. moving). The standard deviation of the base station position is either dependent on the method of absolute positioning used or the standard deviation coming from the integrated navigation solution of the module on the base station platform. For example, if good GNSS is used alone or in the integrated solution this position may be known, for example, to within 1 meter or better. The coordinates of the base station may be constant as in the case if the base station is stationary or it may be changing if the base station is moving.

The coordinates in this example are Cartesian and are referenced to a starting point within a Local Level Frame, the coordinates then could be for example East, North, Up from an initial latitude, longitude, and altitude (this initial point is the origin of the Cartesian coordinate frame under consideration).

North$_k$=($\phi_k$−$\phi_0$)*(M+$h_0$)

East$_k$=($\lambda_k$−$\lambda_0$)*(N+$h_0$)*cos($\phi_0$)

Up$_k$=($h_k$−$h_0$)

To simplify the terminology x, y and z are interchangeably used with East, North, and Up.

The coordinates will be referred to as:
($x_k^B$, $y_k^B$, $z_k^B$) $\sigma_k^B$ for any time epoch k, and
($x_0^B$, $y_0^B$, $z_0^B$) $\sigma_0^B$ for time epoch 0.

2) Consider the rover platform to have an absolutely known location at time epoch 0 with coordinate standard deviation of $\sigma_0^R$. The coordinates (Cartesian coordinates defined from the same origin point as described above for the base station) with their standard deviation are written as ($x_0^R$, $y_0^R$, $z_0^R$) $\sigma_0^R$.

Immediately after time 0, the rover platform begins navigation without absolute position updates and is forced to position itself using INS-only predicted positions. From time epoch 0 to time epoch 1 the platform navigates with a position error that grows with time as given in equation 41. At time epoch 1, the standard deviation $\sigma_1^R$ will be because of the addition of time dependent mechanization position errors and the previous standard deviation $\sigma_0^R$.
($x_1^R$, $y_1^R$, $z_1^R$) $\sigma_1^R$ 3) At time epoch 1 the rover truck receives a range (distance) and coordinate measurement (($x_1^B$, $y_1^B$, $z_1^B$) $\sigma_1^B$) from the base station platform (which may or may not have moved). The measured range $\rho_1^m$ will have errors due to $\sigma_1^B$ and ranging system inaccuracies $\sigma_1^{range}$ $$\rho_1^m = \rho_1^{true} + e(\sigma_1^B) + e(\sigma_1^{range}) \qquad 49$$

Where e(.) denotes the error associated with the respective standard deviation.

4) Using the predicted rover coordinates ($x_1^R$, $y_1^R$, $z_1^R$) at time epoch 1 from the INS-only navigation solution, another distance or range measurement can be computed between the rover predicted INS coordinates and the known base station coordinates as follows:

$$\rho_c^1 = \sqrt{(x_1^R - x_1^B)^2 + (y_1^R - y_1^B)^2 + (z_1^R - z_1^B)^2} \qquad 50$$

The standard deviation of this computed range depend on the standard deviation of the base station coordinates and on the standard deviation of the INS-predicted rover coordinates, the latter is determined directly from the output of the navigation filter on the rover module. This standard deviation is referred to as $\sigma_1^c$.

5) A right angle triangle projected on the horizontal plane can be formed between the base station and rover platform by using horizontal position coordinates of each of the base and rover platforms (FIG. 3). The base station displacement can be determined from absolute navigation information or integrated navigation information and will have variance $\sigma_1^B$. The rover platform error will be dependent on the position error accumulated from time epoch 0 to time epoch 1 and the original rover coordinate errors at time epoch 0.

6) The concept of the right angle triangle was introduced in 5) to visualize the central horizontally angle ($\alpha$) (this angle is in the projection on the horizontal plane), which may be used in the coordinate updates. The angle can be determined by using equation 51 without calculating the right angle triangle.

$$\alpha_1 = \tan^{-1}\left(\frac{y_1^R - y_1^B}{x_1^R - x_1^B}\right) \qquad 51$$

7) A right angle triangle (in the vertical plane passing through the center of the sensor triads of the two modules on the two platforms) can also be formed to solve for the central vertical angle ($\beta$). The right angle triangle is formed between the z axis (vertical axis) and another axis that is projected along the range axis on the horizontal frame. This axis that is projected along the range axis on the horizontal plane is defined as $x'_k$ as its orientation will change at each time epoch depending on the positions of the base and rover platforms in the horizontal plane. FIG. 3 shows $x'_0$ and $x'_1$. FIG. 4 shows a front or side view of the two platforms in the z and $x'_k$ planes. $\beta$ is calculated as:

$$\beta_1 = \tan^{-1}\left(\frac{z_1^R - z_1^B}{x_1^{R'} - x_1^{B'}}\right) \qquad 52$$

8) One possible solution to benefit from the measured range $\rho_1^m$ is to combine it with the calculated range $\rho_1^c$ to form a single range at time epoch 1 using weighted least squares as follows:

$$\rho_1^w = \rho_1^m\left(\frac{\sigma_1^c}{\sigma_1^c + \sigma_1^{range}}\right) + \rho_1^c\left(\frac{\sigma_1^{range}}{\sigma_1^c + \sigma_1^{range}}\right) \qquad 53$$

Using the range computed in equation 46, a new set of rover coordinates ($\tilde{x}_1^R$, $\tilde{y}_1^R$, $\tilde{z}_1^R$) are computed that has reduced errors in comparison to the mechanization-only coordinates. These new values may be used in the navigation filter as measurement updates. The formula to compute this new set of coordinates is provided below.

$\tilde{x}_1^R = \rho_1^w \cos\alpha \cos\beta + x_1^B$ $\tilde{y}_1^R = \rho_1^w \sin\alpha \cos\beta + y_1^B$ $\tilde{z}_1^R = \rho_1^w \sin\beta + z_1^B \qquad 54$ This process (steps 2-8) is repeated for each time epoch and improves the navigation accuracies, especially during the absence of other absolute position updates such as GNSS. In the long-term the rover position will tend to drift linearly with respect to time, as opposed to cubically as in Equation 41.

9) Another possible solution to benefit from the measured range $\rho_k^m$ in and to enhance the INS solution is to use this range information within the navigation filter as a tightly coupled measurement update, using the following:

$$\delta z_k = \rho_k^c - \rho_k^m \quad \quad 55$$

$$H_k = [(\bar{L}_k)^T S 0_{1\times 18} 1 0] \quad \quad 56$$

where $\begin{bmatrix} L_k^x \\ L_k^y \\ L_k^z \end{bmatrix} = \bar{L}_k = \begin{bmatrix} \frac{x_k^R - x_k^B}{\|\bar{r}_k^R - \bar{r}_k^B\|} \\ \frac{y_k^R - y_k^B}{\|\bar{r}_k^R - \bar{r}_k^B\|} \\ \frac{z_k^R - z_k^B}{\|\bar{r}_k^R - \bar{r}_k^B\|} \end{bmatrix}$, $\bar{r}_k^R = [x_k^R \ y_k^R \ z_k^R]^T, \bar{r}_k^B = [x_k^B \ y_k^B \ z_k^B]^T$ and $S = \begin{bmatrix} 0 & (N+h_0)\cos\varphi_0 & 0 \\ M+h_0 & 0 & 0 \\ 0 & 0 & 1 \end{bmatrix}$ The above Example 2 is also valid if a rover platform is tracked by a base station. In this case, all the equations remain the same and the only difference is sending the rover coordinates $((x_1^R, y_1^R, z_1^R) \sigma_1^R)$ information to the base station along with the ranging information.

Example 3

Articulated Structure with Rigid Link

This Example 3 demonstrates some cases where there is a physical link between two platforms having the present MPIRC modules. The concepts presented in this Example 3 apply, and can be generalized, to a physical link between more than two platforms having the MPIRC modules or to any articulated structure.

For demonstration purposes and without limitations, the case of two platforms is discussed in this example. In general, a physical link may be rigid, or non-rigid, or flexible. This Example 3 provides the case of a rigid link (non-rigid or flexible links will be discussed in Example 4). The presence of a physical link will add kinetic constraints that may be used to constrain and consequently, enhance the navigation solution, especially if the absolute navigation information is not available, degraded, or blocked. The systems with rigid links between two or more platforms may be found, such as for example, in agriculture equipment or other articulated platforms, such as for example, tow trucks, trains or the like.

Figure 5:
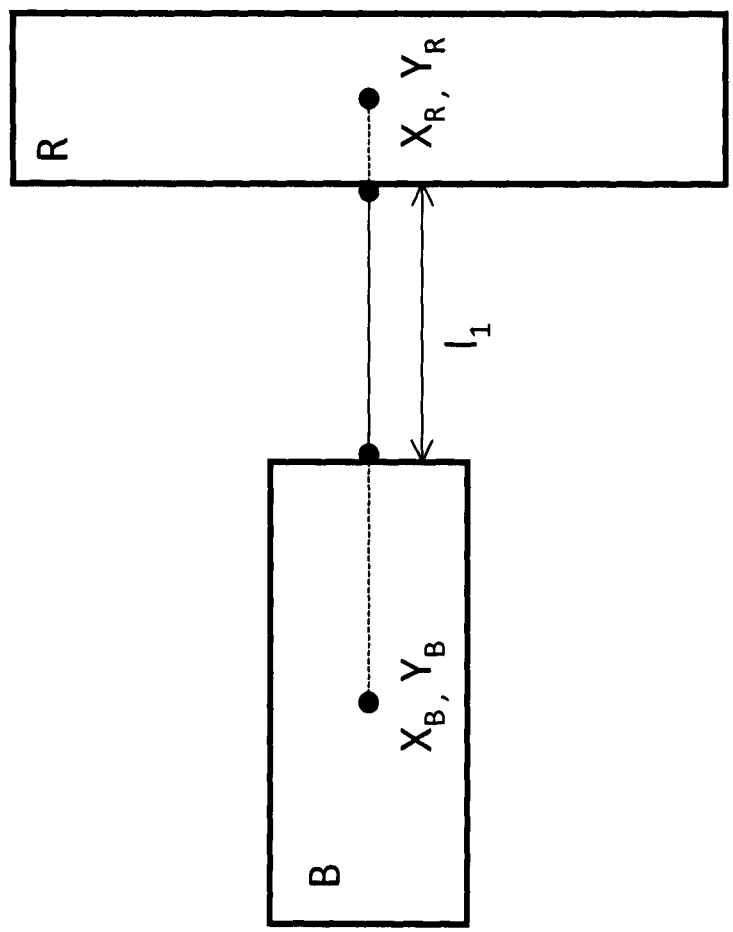
FIG. 5 is a diagram showing two platforms linked with a physical link.

FIG. 5 is a diagram showing two platforms linked with a rigid link, the two platforms each have the navigation module. In this Example 3, both MPIRC-enabled modules comprise a sensor assembly 3 either both modules have a receiver 2 for absolute navigational information, or only one of them has it. If wireless devices are available on the two modules (either one has a receiver the other has a transmitter, or both have transceivers), wireless ranging may be calculated to constrain and enhance the navigation solution of either or both platforms, whether the absolute navigation information is not available (on one of them), or is degraded or denied on one or both of them. The physical rigid link also is used to constrain and enhance the navigation solution of either or both platforms, whether the wireless ranging is available or not, and, whether the absolute navigation information is not available (on one of them), or is degraded or denied on one or both of them.

Figure 6:
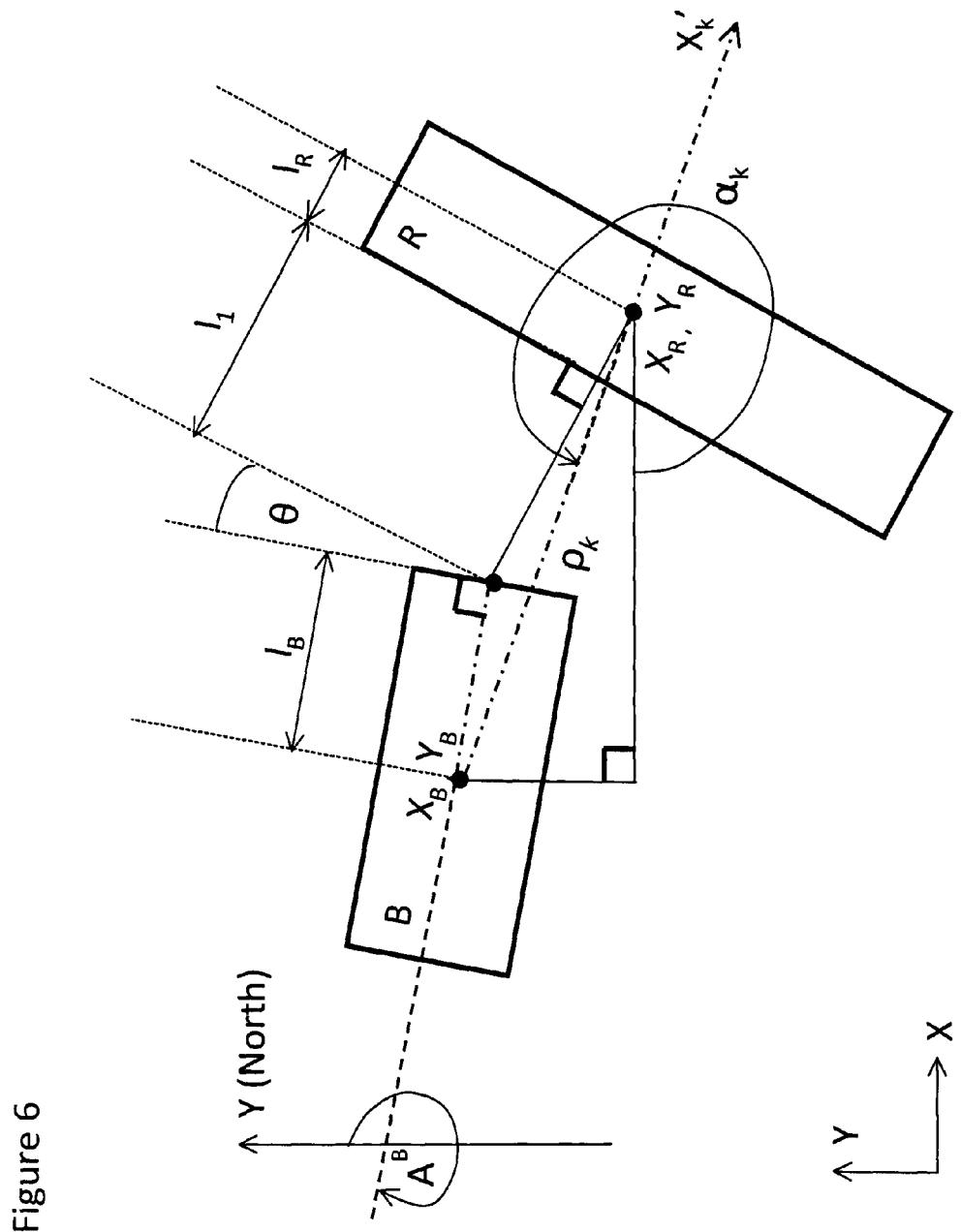
FIG. 6 is a diagram showing two platforms linked with a physical link, where the link has one joint from one side and welded to the other platform from the other side.
Figure 7:
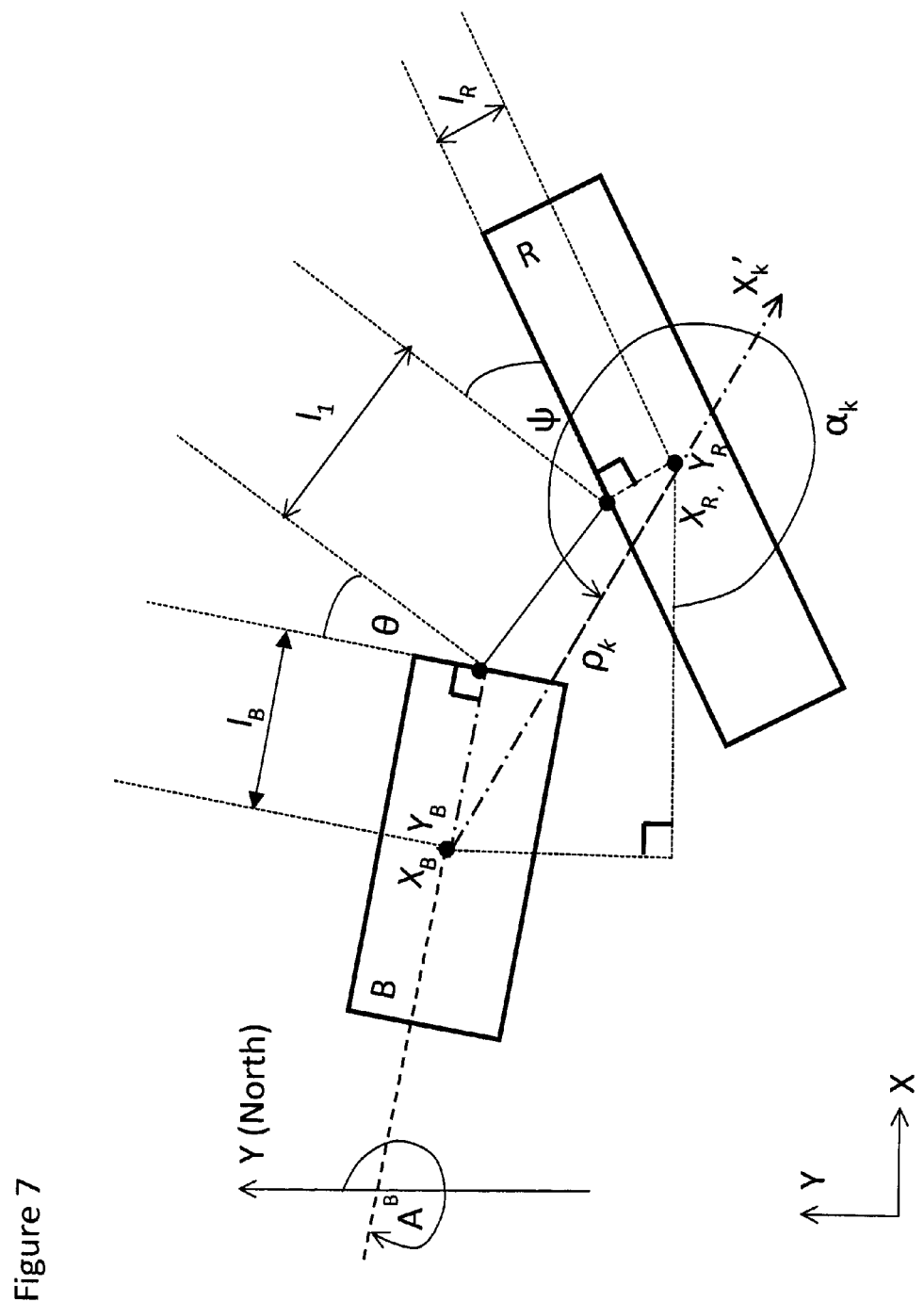
FIG. 7 is a diagram showing two platforms linked with a physical link, where the link has two joints from both side with the two platforms.
Figure 8:
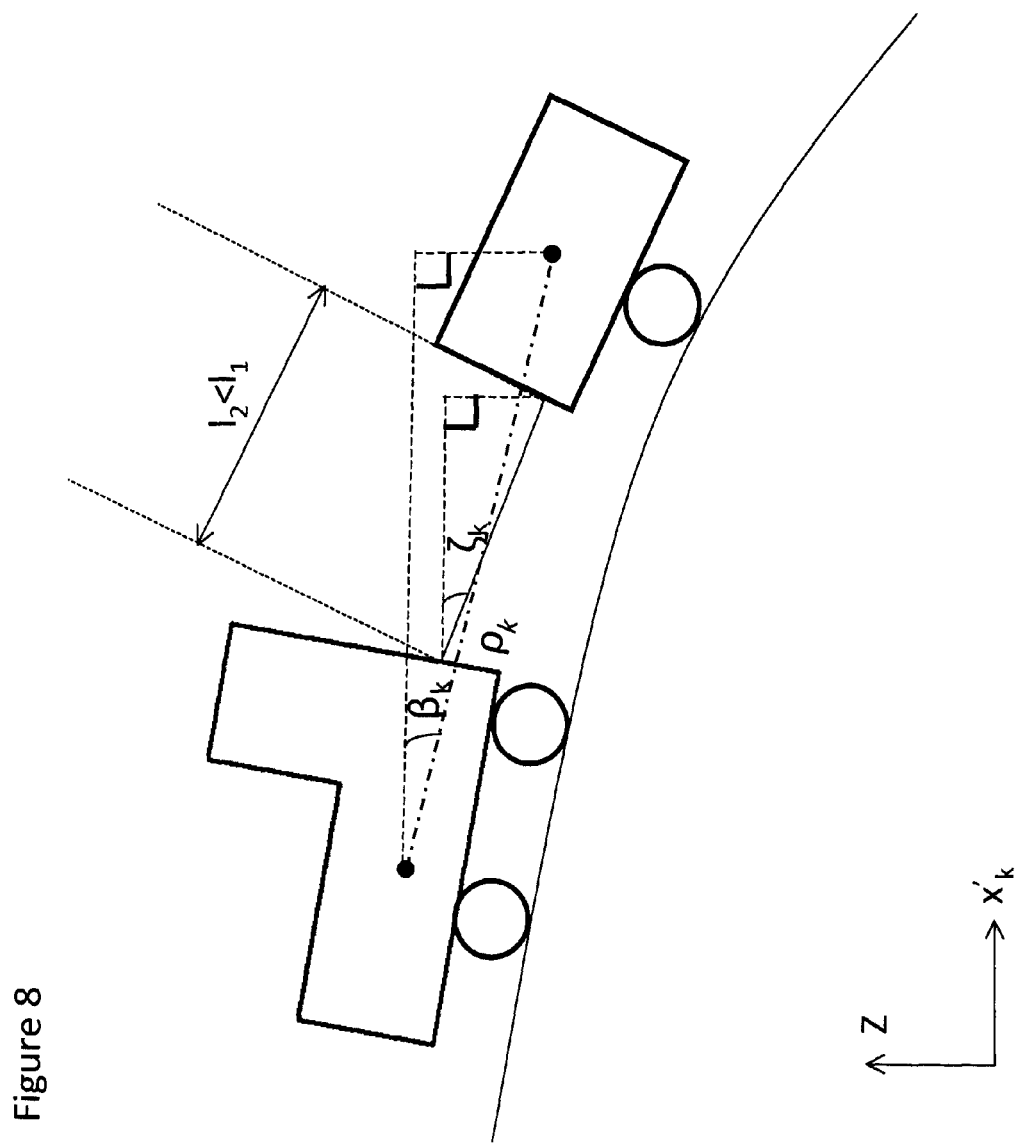
FIG. 8 is a side view diagram showing two platforms linked with a physical link, in a 3D motion scenario.

FIG. 6 and FIG. 7 show two diagrams for the top view of either: (i) a 2D case, or (ii) the horizontal projection of a 3D case. FIG. 8 shows a diagram of the side view of the 3D case. It is to be noted that $1_B$, $1_1$, $1_R$ are known values from the mechanical system at hand.

FIG. 6 shows a case where the rigid link is connected to one of the two platforms through a joint which make the link able to rotate with respect to this platform, and the link is welded or is rigidly fixed to the other platform (i.e. the link is part of the other platform and they move as one piece). FIG. 7 shows a case where the rigid link is connected to both platforms through a joint for each one which makes the link able to rotate with respect to the two platforms. It is to be noted that if the two ends of the rigid link are welded or rigidly fixed to both platform, this means that the two platforms are actually one platform and undergo the same motion, and thus only one navigation module is needed and this case is not related to this example.

In both cases the rigid link will cause Kinetic constraints that can be used to constrain and enhance the navigation solution of one or both platforms as mentioned earlier.

The joints might or might not have sensors to measure the angle of rotation, such as encoders or potentiometers. If such sensors are used and connected to the navigation module wired or wirelessly, their readings may be used to constrain the solution more and to provide more accurate solution.

In the case of FIG. 6 or FIG. 7, the true range $\rho$ is less than $1_B + 1_1 + 1_R$ (the geometry will change depending on the case in either figure), as mentioned earlier this can be used to constrain the navigation solution. If a wireless range $\rho_k^m$ is available at time k, it will be used to constrain and enhance the navigation solution. The wireless range may be used alone without the kinetic constraints from the link or together with these constraints. If wireless ranging is used alone, it will be used as described in either Example 1 or Example 2, depending on whether it is a 2D or 3D navigation solution respectively. If both wireless and link's kinetic constraints are used together, they may be used as separate constraints applied to the navigation solution to enhance it more than using either constraint (this may be, for example, in a least square or tight update to the navigation filter as described in earlier examples), or they may be combined together first and applied to constrain or update the navigation solution.

In the case of FIG. 6 and for demonstration purposes it is assumed here that the rover is the platform that will benefit from the ranging update $\rho_k^m$ in and the base station coordinates along with its standard deviation $(x_k^B, y_k^B) \sigma_k^B$. For demonstration purposes, the following description is for 2D case. From the law of cosines the true range is:

$$(\rho_k)^2 = (l_B)^2 + (l_1 + l_R)^2 - 2l_B(l_1 + l_R)\cos(\pi - \theta_k) \quad \quad 57$$

Thus, the true angle $\theta$ from FIG. 6 can be calculated as follows:

$$\theta_k = \pi - \cos^{-1}\left(\frac{-(\rho_k)^2 + (l_B)^2 + (l_1 + l_R)^2}{2l_B(l_1 + l_R)}\right) \quad \quad 58$$

The measured angle $\theta_k^m$ is calculated from the measured range as follows $\rho_k^m$:

$$\theta_k^m = \pi - \cos^{-1}\left(\frac{-(\rho_k^m)^2 + (l_B)^2 + (l_1 + l_R)^2}{2l_B(l_1 + l_R)}\right) \quad 59$$

The azimuth angle of the base station platform is:

$$A_k^B = \frac{\pi}{2} - \alpha_k - \cos^{-1}\left(\frac{-(l_1 + l_R)^2 + (\rho_k)^2 + (l_B)^2}{2\rho_k l_B}\right) \quad 60$$

Since $A_k^B$ can be obtained from the MPIRC module on the base station (and will be transmitted to the rover if the rover is doing the processing), the angle $\alpha_k$ can be calculated as follows from the true range $\rho_k$:

$$\alpha_k = -A_k^B + \frac{\pi}{2} - \cos^{-1}\left(\frac{-(l_1 + l_R)^2 + (\rho_k)^2 + (l_B)^2}{2\rho_k l_B}\right) \quad 61$$

The measured $\alpha_k$ (i.e. the one calculated from $\rho_k^m$) is:

$$\alpha_k^m = -A_k^B + \frac{\pi}{2} - \cos^{-1}\left(\frac{-(l_1 + l_R)^2 + (\rho_k^m)^2 + (l_B)^2}{2\rho_k^m l_B}\right) \quad 62$$

The rover coordinates can be calculated as follows:

$$\tilde{x}_k^R = \rho_k^m \cos \alpha_k^m + x_k^B$$

$$\tilde{y}_k^R = \rho_k^m \sin \alpha_k^m + y_k^B \quad 63$$

These coordinates may be used as the rover coordinates directly, or they can be combined with the rover solution from the navigation module (whether sensor-only solution or integrated solution (if the absolute navigation information is available and not degraded or blocked), such combination might be in a Least Squares sense or as measurement update to the filtering or state estimation technique used in the MPIRC navigation module.

In the case the joint has a sensor to measure the angle of rotation, then the value $\theta_k^m$ will be measured directly from this sensor and not calculated as in equation 59.

The above described solution and constraints can be generalized to the 3D case, where the side view can be seen in FIG. 8.

In FIG. 7 and for demonstration purposes it is assumed here that the rover is the platform that will benefit from the ranging update knowing the measured range $\rho_k^m$ and the base coordinates along with the standard deviation $(x_k^B, y_k^B) \sigma_k^B$.

For demonstration purposes, the following description is for 2D case. From the geometry of the Figure, one have the following two equations:

$$(\rho_k)^2 = (l_R + l_1 \cos\psi_k + l_B \cos\psi_k \cos\theta_k - l_B \sin\psi_k \sin\theta_k)^2 + (l_1 \sin\psi_k + l_B \sin\psi_k \cos\theta_k + l_B \cos\psi_k \sin\theta_k)^2 \quad 64$$

$$(\rho_k)^2 = (l_B + l_1 \cos\theta_k + l_R \cos\theta_k \cos\psi_k - l_R \sin\theta_k \sin\psi_k)^2 + (l_1 \sin\theta_k + l_R \sin\theta_k \cos\psi_k + l_R \cos\theta_k \sin\psi_k)^2 \quad 65$$

Having the measured range $\rho_k^m$ known, $\theta_k^m$ and $\psi_k^m$ can be calculated.

The azimuth angle of the base station platform is:

$$A_k^B = \frac{\pi}{2} - \alpha_k - \tan^{-1}\left(\frac{l_1 \sin\theta_k + l_R \sin\theta_k \cos\psi_k + l_R \cos\theta_k \sin\psi_k}{l_B + l_1 \cos\theta_k + l_R \cos\theta_k \cos\psi_k - l_R \sin\theta_k \sin\psi_k}\right) \quad 66$$

Since $A_k^B$ can be obtained from the MPIRC module on the base station (and will be transmitted to the rover if the rover is doing the processing), the angle $\alpha_k$ can be calculated as follows from the true range $\rho_k$:

$$\alpha_k = -A_k^B + \frac{\pi}{2} - \tan^{-1}\left(\frac{l_1 \sin\theta_k + l_R \sin\theta_k \cos\psi_k + l_R \cos\theta_k \sin\psi_k}{l_B + l_1 \cos\theta_k + l_R \cos\theta_k \cos\psi_k - l_R \sin\theta_k \sin\psi_k}\right) \quad 61$$

The measured $\alpha_k$ (i.e. the one calculated from $\rho_k^m$) is:

$$\alpha_k^m = -A_k^B + \frac{\pi}{2} - \tan^{-1}\left(\frac{l_1 \sin\theta_k^m + l_R \sin\theta_k^m \cos\psi_k^m + l_R \cos\theta_k^m \sin\psi_k^m}{l_B + l_1 \cos\theta_k^m + l_R \cos\theta_k^m \cos\psi_k^m - l_R \sin\theta_k^m \sin\psi_k^m}\right) \quad 62$$

The rover coordinates can be calculated as follows:

$$\tilde{x}_k^R = \rho_k^m \cos \alpha_k^m + x_k^B$$

$$\tilde{y}_k^R = \rho_k^m \sin \alpha_k^m + y_k^B \quad 63$$

These coordinates may be used as the rover coordinates directly, or they can be combined with the rover solution from the navigation module (whether sensor-only solution or integrated solution (if the absolute navigation information is available and not degraded or blocked), such combination might be in a Least Squares sense or as measurement update to the filtering or state estimation technique used in the MPIRC navigation module.

In the case the joints have a sensors to measure the angles of rotation, then the value $\theta_k^m$ and $\psi_k^m$ will be measured directly from the sensors and not calculated as in equations 64 and 65.

The above described solution and constraints can be generalized to the 3D case, where the side view can be seen in FIG. 8.

Example 4

Floating and Submerged Platforms

In this Example 4, the "rover device" is a submerged platform (such as, for example, a sonobuoy, see FIG. 9) and the base station is a floating platform. The base station has a receiver 2 to receive absolute navigation information such as a GNSS receiver, and the sensor assembly 3 may or may not be present. If the base station module has the sensor assembly 3, it might also have a module capable of providing an integrated navigation solution as described earlier. The submerged platform does not have a GNSS receiver, but does have a sensor assembly 3. Both the floating and submerged platforms might have wireless devices 12, such as transceivers for sending and/or receiving wireless signals (such as for example, in the underwater case, acoustic signals) and a technique to produce an output in the form of ranging distance between the floating and submerged platforms. The floating base station and the submerged rover might be moving independently but in the same area so that they have signal transmission between them, or they might be physically connected by a cable or non-rigid or flexible link of known length.

Figure 9:
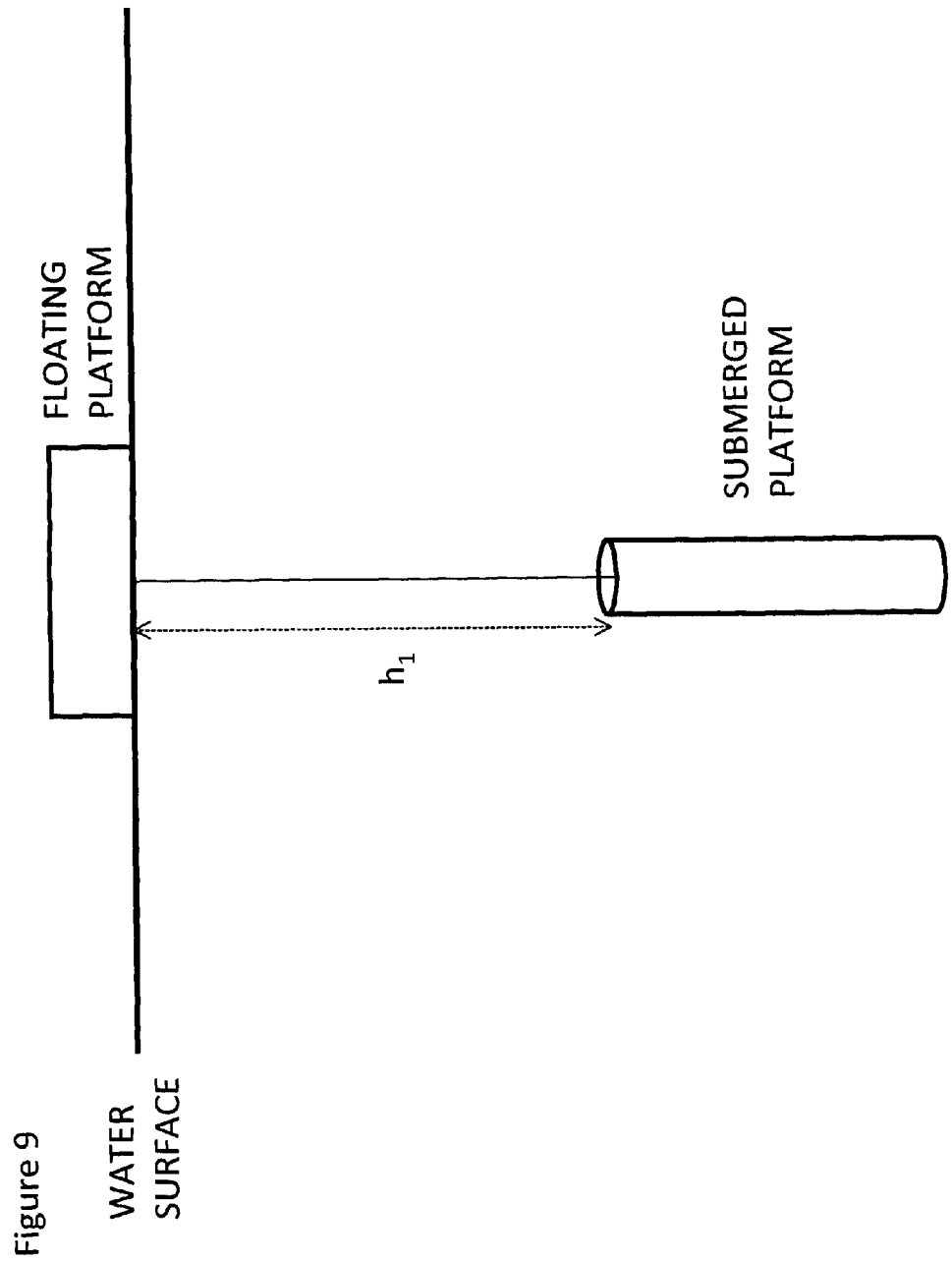
FIG. 9 is a side view diagram showing two platforms (one floating and the other submerged).
Figure 10:
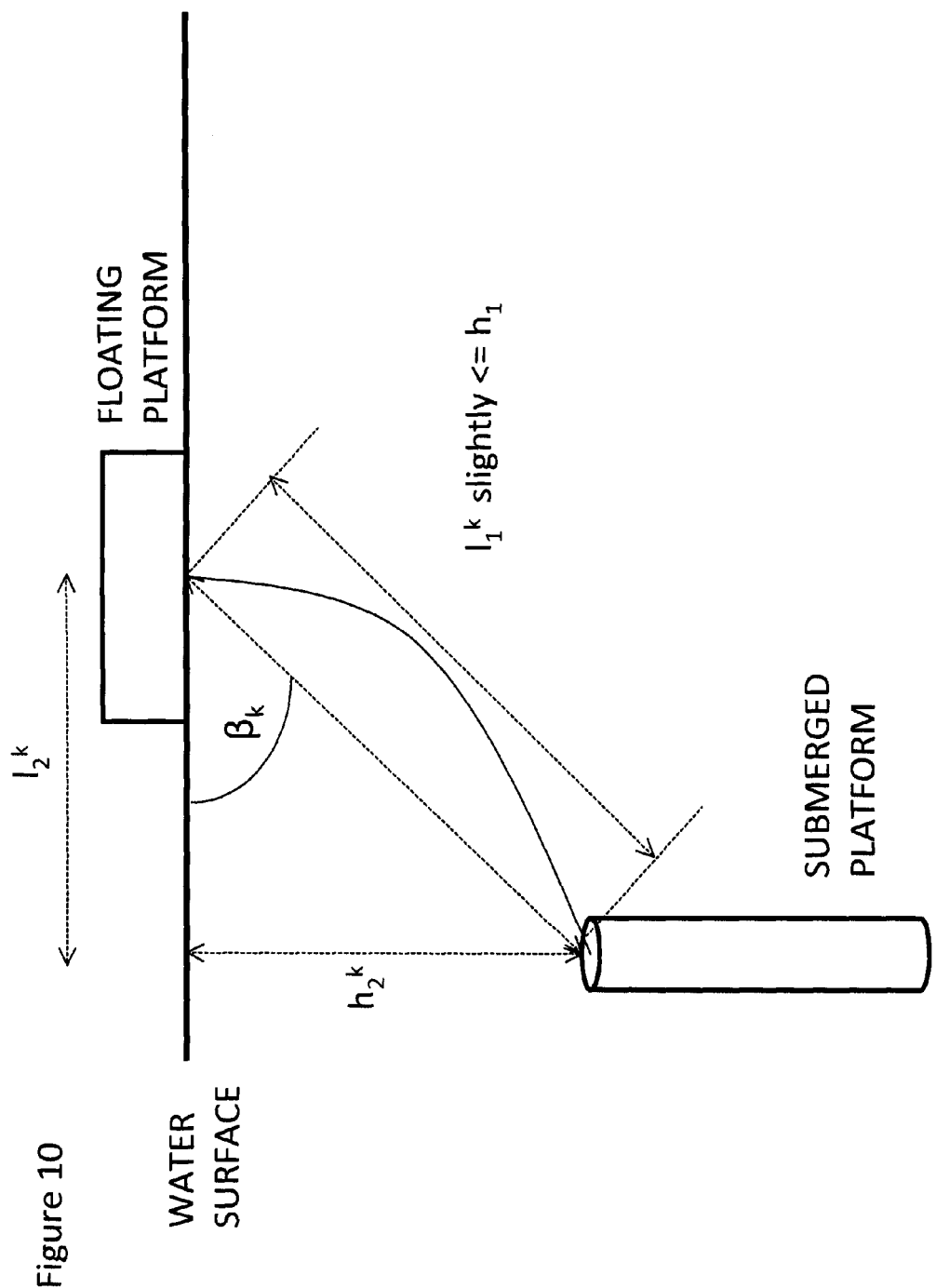
FIG. 10 is a side view diagram showing two platforms (one floating and the other submerged) wherein the platforms may be moving because of water currents, together with some constraints on the solution.
Figure 11:
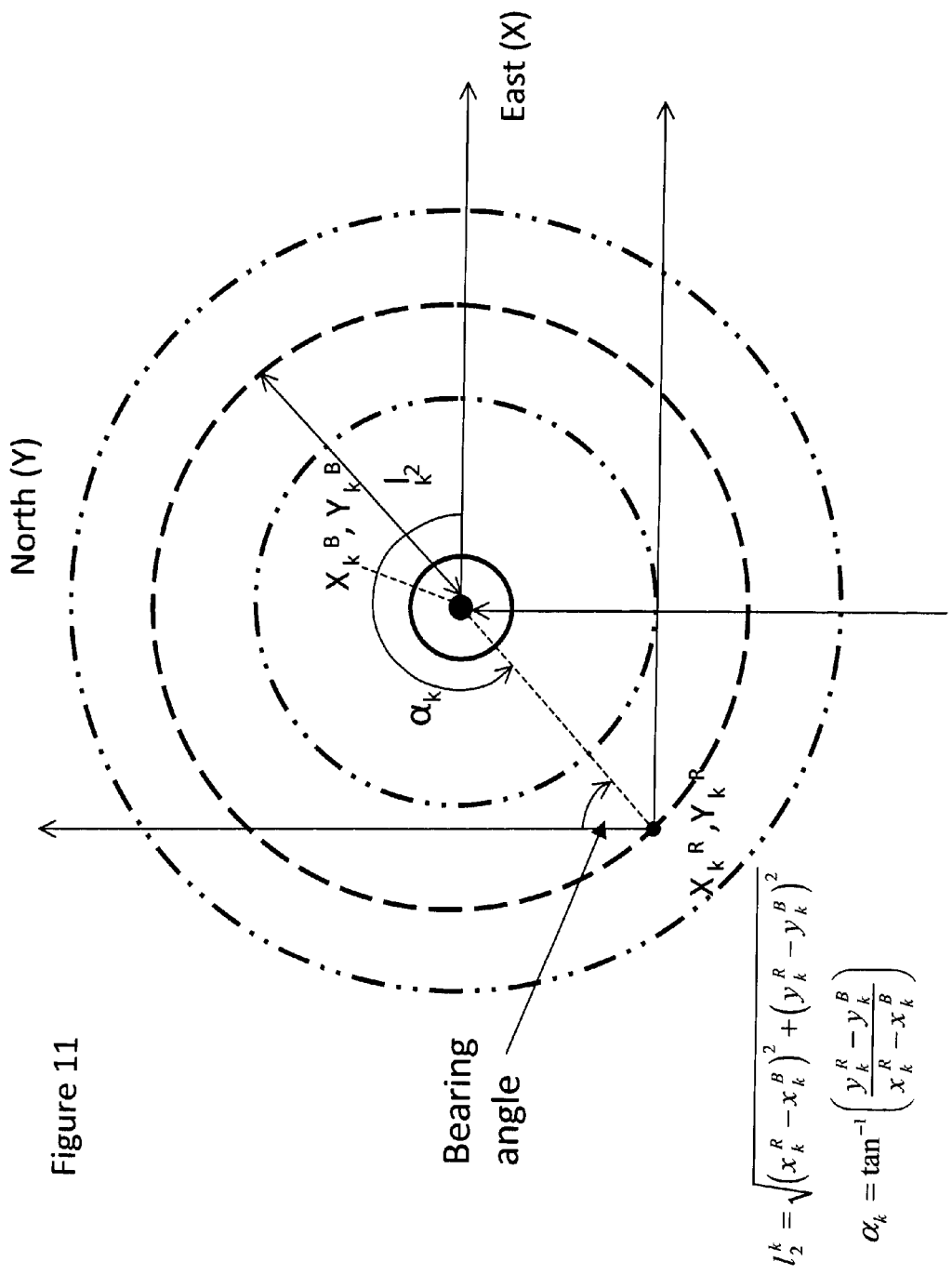
FIG. 11 is a top view diagram showing two platforms (one floating and the other submerged) moving because of water currents together with some constraints on the solution.

A typical situation of the Example 4 is shown in FIG. 10, whether the physical cable exists or a wireless ranging technique is used. If a physical cable exists, its length labeled $h_1$ in FIG. 9 is known, and the distance $l_1$ is slightly less than $h_1$ as shown in FIG. 10. If wireless ranging technique is used, the distance $l_1$ is known with an error with standard deviation $\sigma^{l1}$. FIG. 11 show a top view of the system shown in FIG. 10.

Since the coordinates of the floating platform and the range between the two platforms (with an error) are known, the techniques presented in Example 2 (since this is a 3D problem) can be used to enhance the navigation solution of the submerged rover instead of using sensor only navigation.

In addition to the above discussed enhancements, further enhancements can be achieved by using additional sensors or information.

The height between the water surface and the submerged platform (labeled $h_2$ in FIG. 10) may be known (with a measurement error of standard deviation $\sigma^{h2}$) using the appropriate pressure sensor. Accordingly an estimate of the distance $l_2$ (within an error margin with standard deviation $\sigma^{l2}$) at time k: $l_2^k = \sqrt{h_2^k + l_1^k}$ can be obtained as well as a better estimate for the angle β (within an error margin with standard deviation $\sigma^\beta$). These new information can be used to constrain the navigation solution of the submerged rover, these constraints will further enhance the solution by bounding the growth of error of inertial sensors navigation. One way of implementing these constraints, is to use them in the measurement update phase of the state estimation or filtering technique used. The height measured by the pressure sensor may be used for height update in the navigation filter, $l_2$ may be used to constrain the horizontal position components. Although $l_2$ and β may be used, the information provided is redundant with $h_2$ and $l_2$.

Where a wireless signal is used (such as for example acoustic signal with a certain dedicated frequency) and angle of arrival (also called bearing angle), which if defined in 2D will be one angle or two angles if defined in 3D direction, is estimated (this is a common practice in underwater systems such as for example in sonobuoys), this additional information can be used to constrain the navigation solution of the submerged platform and thus further enhancing its accuracy. One way to do this is tight update to the state estimation or filtering technique used in the MPIRC module on the submerged. One other possibility is to obtain a positioning solution of the submerged platform from the measured range and the angle of arrival and use this position as loosely-coupled update to the state estimation or filtering technique used in the MPIRC module on the submerged. This position update may be a 2D update or a 3D update depending on the type of submerged system used. If the angle of arrival is obtained only in 2D, it will be used together with both $l_2$ described above and the floating platform 2D position to obtain the submerged platform 2D position (see FIG. 11). If the full 3D information of the angle of arrival is available, then the measured range itself may be used together with the angles information and the 3D position of the floating platform to obtain the 3D position of the submerged platform.

Another sensor that may be used instead or in addition to the above, is a transceiver dedicated to detect the Doppler shift and estimate the submerged rover platform velocities accordingly. These velocities (although they have some measurements errors) can be used as measurements update for the state estimation or filtering technique. This enhances upon the inertial sensors only navigation.

If a cable is connecting the base station and the rover, and if the nature of the cable used make it flexible such that it can bend easily (such as for example the cable drawn in FIG. 10), and if $h_1$ is not a very good estimate for $l_1$, sensors measuring the tension may be added to the cable to measure its bending and their measurements can be sent to the navigation module in the submerged platform. This will enable having a better estimate for the distance $l_1$ and thus a better navigation solution for the submerged platform.

Any of the above ideas or a combination of them, will generate an enhanced solution due to the improved estimate of the range distance $l_1$.

If the submerged system is a sonobuoy used for underwater target tracking, getting a better estimate of the sonobuoy position (rather than considering it as having the same horizontal location as the horizontal location of the floating platform connected to it) will enhance the accuracy of the target tracking (i.e. the estimated target track will be closer to the true track) because the part of the track error due to the sonobouy location error will be much smaller.

In some systems whether the submerged platform can move freely without being physically connected to a floating platform or it is physically connected to one floating platform, several floating platforms (several base stations as described in the beginning of this example) can be used and transceivers can be mounted on the base stations and the submerged rover with dedicated wireless signals (such as dedicated acoustic signals) to be sent and received between these floating platforms and the submerged rover. These signals can be used for obtaining ranges from different floating base stations to the submerged rover (these ranges will have some measurements errors). These range measurements can either: (i) be used to obtain a positioning and navigation solution of the submerged system by trilateration techniques, such as for example Least Squares (LS)-based techniques; (ii) be used such as in (i) and the positioning solution obtained can provide measurement updates in a loosely coupled scheme to a state estimation or filtering technique that integrates these measurements with the inertial sensors in the module on the submerged rover; or (iii) be used directly as measurements updates in a tightly coupled scheme to a state estimation or filtering technique that integrates these measurements with the inertial sensors in the module on the submerged rover.

The invention claimed is:

1. A method for combining different forms of navigational information, or a subset thereof, for producing a navigation solution of a first module, wherein the first module is operative to combine different forms of navigational information or a subset thereof, and enabled to communicate to at least one second module operative to combine different forms of navigational information or a subset thereof, wherein the first module and the at least one second module are mobile and the at least one second module has a variable position with respect to the first module, the method comprising:

a) obtaining readings from a sensor assembly of self-contained sensors within the first module and from a sensor assembly of self-contained sensors within the at least one second module, wherein the readings relate to navigational information of the first and at least one second modules, respectively, and producing outputs indicative thereof;

b) obtaining absolute navigational information for at least one of the first module and the at least one second module from external sources, and producing an output indicative thereof;

c) receiving and/or transmitting signals used to estimate ranging information between the first module and the at least one second module, wherein the estimated ranging information comprises a distance between the first module and the at least one second module determined from a measured characteristic of the signals, receiving and/or transmitting a navigation state of at least one of the first module and the at least one second module, and producing aiding signals comprising the estimated ranging information and the navigation state; and d) providing at least one processor for processing at least the sensor assembly readings of the first module and the aiding signals to produce a navigation solution relating to the first module, wherein the at least one processor is configured to utilize the aiding signals to enhance the navigation solution when absolute navigation information for the first module is limited, degraded or denied or when the first module does not have absolute navigation capability.

2. The method of claim 1, wherein the sensor assembly of the first module comprises accelerometer means for measuring module specific forces and obtain accelerations and gyroscope means for measuring turning rates.

3. The method of claim 2, wherein the sensor assembly of the first module comprises at least two accelerometers and one gyroscope.

4. The method of claim 2, wherein the sensor assembly of the first module comprises three accelerometers and three gyroscopes.

5. The method of claim 1, wherein the absolute navigational information is obtained by a receiver.

6. The method of claim 5, wherein the receiver is a GNSS receiver.

7. The method of claim 6, wherein the GNSS receiver is a Global Positioning System receiver.

8. The method of claim 1, wherein the first module is positioned on a first platform, and the at least one second module is positioned on at least one second platform.

9. The method of claim 1, wherein the transceiver is a wireless or wired transceiver.

10. The method of claim 9, wherein the wireless transceiver uses signals appropriate to the transmission medium.

11. The method of claim 1, wherein the at least one processor is programmed to use a state estimation technique.

12. The method of claim 11, wherein the state estimation technique is linear or non-linear.

13. The method of claim 12, wherein the state estimation technique is an Extended Kalman Filter.

14. The method of claim 1, wherein the navigation solution is determined via a loosely or a tightly coupled integration scheme.

15. The method of claim 8, wherein the first platform is physically linked to at least one second platform.

16. The method of claim 15, wherein the physical link between the first platform and the at least one second platform enables the use of kinetic constraints that can be used to enhance the navigation solution of the first module.

17. The method of claim 15, wherein the physical link is a rigid link.

18. The method of claim 15, wherein the physical link is a non-rigid or flexible link.

19. A first module for producing a navigation solution, operative to combine different forms of navigational information, or a subset thereof, and enabled to communicate with at least one second module operative to combine different forms navigational information including from a sensor assembly of self-contained sensors within the at least one second module, or a subset thereof, wherein the first module and the at least one second module are mobile and the at least one second module has a variable position with respect to the first module, the first module comprising:

a) an assembly of self-contained sensors, within the first module, capable of obtaining readings relating to the navigational information of the first module, and producing an output indicative thereof;

b) a transceiver for receiving and/or transmitting signals used to estimate ranging information between the first module and the at least one second module, wherein the estimated ranging information comprises a distance between the first module and the at least one second module determined from a measured characteristic of the signals, receiving and/or transmitting a navigation state of at least one of the first module and the at least one second module, and for producing aiding signals comprising the estimated ranging information and the navigation state; and c) at least one processor coupled to receive at least the sensor assembly readings and the aiding information to produce a navigation solution relating to the first module, wherein the at least one processor is configured to utilize the aiding information to enhance the navigation solution of the first module when absolute navigational information for the first module is limited, degraded or denied or when the first module does not have absolute navigation capability.

20. The first module of claim 19, wherein the sensor assembly of the first module comprises accelerometer means for measuring module specific forces and obtain accelerations and gyroscope means for measuring turning rates.

21. The first module of claim 20, wherein the sensor assembly of the first module comprises at least two accelerometers and one gyroscope.

22. The first module of claim 20, wherein the sensor assembly of the first module comprises three accelerometers and three gyroscopes.

23. The first module of claim 19, further comprising a receiver for obtaining the absolute navigational information.

24. The first module of claim 23, wherein the receiver is a GNSS receiver.

25. The first module of claim 24, wherein the GNSS receiver is a Global Positioning System receiver.

26. The first module in claim 19, wherein the first module is positioned on a first platform and the at least one second module is positioned on at least one second platform.

27. The first module of claim 19, wherein the transceiver is a wireless or wired transceiver.

28. The first module of claim 27, wherein the wireless transceiver uses signals appropriate to the transmission medium.

29. The first module of claim 19, wherein the at least one processor is programmed to use a state estimation technique.

30. The first module of claim 29, wherein the state estimation technique is linear or non-linear.

31. The first module of claim 30, wherein the state estimation technique is an Extended Kalman Filter.

32. The first module of claim 19, wherein the navigation solution is determined via a loosely or a tightly coupled integration scheme.

33. The first module in claim 26, wherein the first platform is physically linked to at least one second platform.

34. The first module in claim 33, wherein the physical link between the first platform and the at least one second platform enables the use of kinetic constraints that can be used to enhance the navigation solution of the first module.

35. The first module in claim 33, wherein the physical link is a rigid link.

36. The first module in claim 33, wherein the physical link is a non-rigid or flexible link.

37. A system for combining different forms of navigational information, or a subset thereof, comprising:
- a mobile first module having a sensor assembly of self-contained sensors capable of obtaining readings relating to navigational information of the first module and a transceiver, wherein the first module is operative to combine different forms of navigational Information or subset thereof;
- a mobile second module having a sensor assembly of self-contained sensors capable of obtaining readings relating to navigational information of the second module and a transceiver, wherein the second module is operative to combine different forms of navigational information or subset thereof;
- a source of absolute navigation information for at least one of the first module and the second module; and at least one processor;
- wherein the first module and the second module have variable positions with respect to each other;
- wherein the transceiver of the first module and the transceiver of the second module receive and/or transmit signals used to estimate ranging information between the first module and the second module, the estimated ranging information comprising a distance between the first module and the at least one second module determined from a measured characteristic of the signals, and receive and/or transmit a navigation state of at least one of the first module and the second module, and produce aiding signals comprising the estimated ranging information and the navigation state; and
- wherein the at least one processor is configured to process the aiding signals and readings from at least one of the sensor assemblies of the first module and the second module to produce a navigation solution relating to a corresponding module, wherein the at least one processor is configured to utilize the aiding signals to enhance the navigation solution when absolute navigation information for the corresponding module is limited, degraded or denied or when the corresponding module does not have absolute navigation capability.

\* \* \* \* \*